United States Patent
Lin et al.

(10) Patent No.: US 12,531,161 B2
(45) Date of Patent: Jan. 20, 2026

(54) SYSTEMS AND METHODS FOR GENERATING MATERIAL MAPS FOR TREATMENT PLANNING USING MONTE CARLO METHODS

(71) Applicants: Emory University, Atlanta, GA (US); Washington University, St. Louis, MO (US)

(72) Inventors: Liyong Lin, Atlanta, GA (US); Serdar Charyyev, Atlanta, GA (US); Chih-Wei Chang, Atlanta, GA (US); Tiezhi Zhang, Crev Coeur, MO (US); Xiaofeng Yang, Atlanta, GA (US); Joseph Harms, Atlanta, GA (US)

(73) Assignees: Emory University, Atlanta, GA (US); Washington University, St. Louis, MO (US)

( * ) Notice: Subject to any disclaimer, the term of this patent is extended or adjusted under 35 U.S.C. 154(b) by 195 days.

(21) Appl. No.: 18/037,861

(22) PCT Filed: Nov. 19, 2021

(86) PCT No.: PCT/US2021/060162
§ 371 (c)(1),
(2) Date: May 19, 2023

(87) PCT Pub. No.: WO2022/109314
PCT Pub. Date: May 27, 2022

(65) Prior Publication Data
US 2024/0006077 A1    Jan. 4, 2024

Related U.S. Application Data

(60) Provisional application No. 63/115,777, filed on Nov. 19, 2020.

(51) Int. Cl.
*G16H 50/50* (2018.01)
*A61B 6/03* (2006.01)
(Continued)

(52) U.S. Cl.
CPC ............ *G16H 50/50* (2018.01); *A61B 6/032* (2013.01); *A61B 6/12* (2013.01); *A61B 6/4241* (2013.01);
(Continued)

(58) Field of Classification Search
CPC ................ A61N 5/1031; A61N 5/1048; A61N 2005/1034; A61N 2005/1041;
(Continued)

(56) References Cited

U.S. PATENT DOCUMENTS 10,159,851 B2    12/2018    Hartman et al.
10,806,950 B2    10/2020    Fahrig et al.
(Continued)

FOREIGN PATENT DOCUMENTS

| | | |
|---|---|---|
| CN | 110302475 B | 2/2021 |
| CN | 112349383 A | 2/2021 |
| DE | 102011055075 A1 | 5/2012 |

OTHER PUBLICATIONS

Akiba et al. "Charged particle tracking with the Timepix ASIC." Nuclear Instruments and Methods in Physics Research Section A: Accelerators, Spectrometers, Detectors and Associated Equipment. 2012; 661(1):31-49.
(Continued)

*Primary Examiner* — Irakli Kiknadze
(74) *Attorney, Agent, or Firm* — Emory Patent Group

(57) ABSTRACT

The disclosure relates to systems and methods for accurate generation of material maps of volume of interests, for example, that include implants, for proton radiation therapy. In one implementation, the method may include determining (Continued)

most probable energy (MPE) using particle energy determined from particle counting data. The method may include generating a plurality of simulations that simulate interactions using different combination of properties for the volume of interest determined from representation data and/or from a database to determine most probable energy (MPE) for each simulation. The method may include comparing the MPE determined using the particle counting data to the MPE determined from each simulation. The method may further include selecting one simulation of the plurality of simulations based on the comparing. The method may also include generating a material map for the volume of interest using the one or more properties corresponding to the one simulation.

20 Claims, 14 Drawing Sheets

(51) Int. Cl.
    *A61B 6/12*      (2006.01)
    *A61B 6/42*      (2024.01)
    *A61N 5/10*      (2006.01)
    *G16H 20/40*     (2018.01)
(52) U.S. Cl.
    CPC ........... *A61N 5/1031* (2013.01); *G16H 20/40* (2018.01); *A61N 2005/1034* (2013.01)
(58) Field of Classification Search
    CPC ............ A61N 2005/1087; A61N 5/103; A61N 2005/109; A61N 5/1071; A61N 5/1039; A61N 2005/1074; A61B 6/032; A61B 6/12; A61B 6/4241; A61B 8/5223; A61B 6/5217; A61B 6/482; A61B 6/50; A61B 6/5205; A61B 6/5258; A61B 6/5282; A61B 6/584; A61B 6/03; A61B 6/582; G16H 20/40; G16H 50/50; G16H 70/20; G16H 50/30; G01T 1/02; G01T 1/16; G01T 1/169; G01T 1/36; G01T 7/005; G06T 11/005; G06T 11/006; G06T 11/008; G06T 2211/408; G06T 2211/424; G06T 5/002; G06T 2207/10104; G06T 5/70; G01N 2223/401; G01N 2223/419; G06F 17/50
    USPC .................... 378/4, 19, 63, 65, 207
    See application file for complete search history.

(56) References Cited

U.S. PATENT DOCUMENTS

| | | | | |
|---|---|---|---|---|
| 2014/0341333 | A1* | 11/2014 | Wang | H10F 39/189 378/19 |
| 2015/0154374 | A1* | 6/2015 | Hissoiny | G16H 50/30 703/6 |
| 2017/0186195 | A1* | 6/2017 | Lin | A61B 6/5258 |
| 2018/0113227 | A1* | 4/2018 | Lin | G01T 1/169 |
| 2019/0192880 | A1 | 6/2019 | Hibbard | |
| 2022/0061794 | A1* | 3/2022 | Schildkraut | A61B 6/482 |

OTHER PUBLICATIONS

Asbah et al. "Measurement of the efficiency of the pattern recognition of tracks generated by ionizing radiation in a TIMEPIX detector." Journal of Instrumentation. 2014; 9:C05021.
Bergmann et al. "3D track reconstruction capability of a silicon hybrid active pixel detector." The European Physical Journal C. 2017; 77:421.
Bouchami et al. "Measurement of pattern recognition efficiency of tracks generated by ionizing radiation in a Medipix2 device." Nuclear Instruments and Methods in Physics Research Section A: Accelerators, Spectrometers, Detectors and Associated Equipment. 2011; 633:S187-S189.
Brooke et al. "An inhomogeneous most likely path formalism for proton computed tomography." Physica Medica. 2020; 70:184-195.
Caicedo et al., "Characterization of a Timepix detector-based hodoscope for the measurement of mixed radiation fields." 2014 IEEE Nuclear Science Symposium and Medical Imaging Conference (NSS/MIC), Seattle, WA, USA. 2014; 1-5.
Chang et al. "A standardized commissioning framework of Monte Carlo dose calculation algorithms for proton pencil beam scanning treatment planning systems." Medical Physics. 2020; 47(4):1545-1557.
Chang et al. "Validation of a deep learning-based material estimation model for Monte Carlo dose calculation in proton therapy." Physics in Medicine & Biology. 2022; 67(21): 10.1088/1361-6560/ac9663.
Charyyev et al. "Optimization of hexagonal-pattern minibeams for spatially fractionated radiotherapy using proton beam scanning." Medical Physics. 2020; 47(8):3485-3495.
Charyyev et al. "A novel proton counting detector and method for the validation of tissue and implant material maps for Monte Carlo dose calculation." Physics in Medicine & Biology. 2021; 66(4):045003.
Charyyev et al. "Accurate characterization of metal implants and human materials using novel proton counting detector for Monte Carlo dose calculation in proton therapy." Proceedings of SPIE, Medical Imaging 2021: Physics of Medical Imaging. 2021; 11595:15950B.
Charyyev et al. "Accurate characterization of metal implants and human materials using novel proton counting detector for Monte Carlo dose calculation in proton therapy" [Online Video Presentation]. Presented at Medical Imaging 2021: Physics of Medical Imaging—Virtual, Online, United States, Feb. 15-19, 2021. Available at: https://www.spiedigitallibrary.org/conference-proceedings-of-spie/11595/115950B/Accurate-characterization-of-metal-implants-and-human-materials-using-novel/10.1117/12.2581751.short.
Chen et al. "Prior image constrained compressed sensing (PICCS): a method to accurately reconstruct dynamic CT images from highly undersampled projection data sets." Medical Physics. 2008; 35(2):660-3.
Chen et al. "Temporal resolution improvement using PICCS in MDCT cardiac imaging." Medical Physics. 2009; 36(6):2130-5.
Granja et al. "Resolving power of pixel detector Timepix for wide-range electron, proton and ion detection." Nuclear Instruments and Methods in Physics Research Section A: Accelerators, Spectrometers, Detectors and Associated Equipment. 2018; 908: 60-71.
Granja et al. "Wide-range tracking and LET-spectra of energetic light and heavy charged particles." Nuclear Instruments and Methods in Physics Research Section A: Accelerators, Spectrometers, Detectors and Associated Equipment. 2021; 98: 164901.
Heijne et al. "Vectors and submicron precision: redundancy and 3D stacking in silicon pixel detectors." Journal of Instrumentation. 2010; 5:C06004.
Holy et al. "Pattern recognition of tracks induced by individual quanta of ionizing radiation in Medipix2 silicon detector." Nuclear Instruments and Methods in Physics Research Section A: Accelerators, Spectrometers, Detectors and Associated Equipment. 2008; 591(1):287-290.
Huang et al. "Validation and clinical implementation of an accurate Monte Carlo code for pencil beam scanning proton therapy." Journal of Applied Clinical Medical Physics. 2018; 19(5): 558-572.
Jakubek et al. "Selective detection of secondary particles and neutrons produced in ion beam therapy with 3D sensitive voxel detector." Journal of Instrumentation. 2011; 6: C12010.
Jakubek, Jan. "Precise energy calibration of pixel detector working in time-over-threshold mode." Nuclear Instruments and Methods in Physics Research A. 2011; 633:S262-S266.
Keahey et al. "Lessons learned from the Chameleon testbed." Proceedings of the 2020 USENIX Conference on Usenix Annual Technical Conference (USENIX ATC'20). USENIX Association, USA. 2020; 15:219-233.

(56) References Cited

OTHER PUBLICATIONS

Lin et al. "Experimentally validated pencil beam scanning source model in TOPAS." Physics in Medicine & Biology. 2014; 59:6859.

Lin et al. "A benchmarking method to evaluate the accuracy of a commercial proton monte carlo pencil beam scanning treatment planning system." Journal of Applied Clinical Medical Physics. 2017; 18(2):44-49.

McCollough et al. "Dual- and Multi-Energy CT: Principles, Technical Approaches, and Clinical Applications." Radiology. 2015; 276(3):637-653.

McCollough et al. "Principles and applications of multienergy CT: Report of AAPM Task Group 291." Medical Physics. 2020; 47(7):e881-e912.

Opalka et al. "Linear energy transfer and track pattern recognition of secondary radiation generated in hadron therapy beam in a PMMA target." Journal of Instrumentation. 2013; 8(2):C02047.

Perl et al. "TOPAS: an innovative proton Monte Carlo platform for research and clinical applications." Medical Physics. 2012; 39(11):6818-6837.

Schneider et al. "Correlation between CT numbers and tissue parameters needed for Monte Carlo simulations of clinical dose distributions." Physics in Medicine and Biology. 2000; 45(2):459-478.

Schulte et al. "A maximum likelihood proton path formalism for application in proton computed tomography." Medical Physics. 2008; 35(11):4849-4856.

Stasica et al. "A Simple Approach for Experimental Characterization and Validation of Proton Pencil Beam Profiles." Frontiers in Physics. 2020; 8:346.

Tang et al. "Temporal resolution improvement in cardiac CT using PICCS (TRI-PICCS): performance studies." Medical Physics. 2010; 37(8):4377-4388.

Turecek et al. "Dependence on temperature and pixel threshold of the calibration for the Timepix detector and its correction method." Journal of Instrumentation. 2013; 8:C01010.

Turecek et al. "USB 3.0 readout and time-walk correction method for Timepix3 detector." Journal of Instrumentation. 2016; 11:C12065.

Xu et al. "Evaluation of Energy Loss and Charge Sharing in Cadmium Telluride Detectors for Photon-Counting Computed Tomography," IEEE Transactions on Nuclear Science. 2011; 58(3):614-625.

International Search Report and Written Opinion for PCT Application No. PCT/US2021/060162 dated Feb. 8, 2022.

* cited by examiner

| Path through CMAP | Location | Tissue length (cm) | | | |
|---|---|---|---|---|---|
| | | Soft tissue | Spinal Cord | Bone | Total |
| t1 | −10 | 17.02 | 0 | 0.93 | 17.95 |
| t2 | −5 | 21.22 | 0 | 0 | 21.22 |
| t3 | 0 | 14.76 | 1.57 | 6.06 | 22.39 |
| t4 | 5 | 21.16 | 0 | 0 | 21.16 |
| t5 | 10 | 17.95 | 0 | 0.86 | 18.81 |

| Material | Meas. density (g cm⁻³) | Meas. diameter (mm) | Meas. CSP (mm) | Meas. RSP | Sim. CSP (mm) | Sim. RSP | ΔRSP measurement— Simulation |
|---|---|---|---|---|---|---|---|
| Bone | 1.59 | 4.94 | 7.30 | 1.478 | 7.27 | 1.472 | +0.4% |
| Al | 2.70 | 4.94 | 10.19 | 2.063 | 10.14 | 2.053 | +0.5% |
| Ti | 4.54 | 4.74 | 14.63 | 3.086 | 14.61 | 3.082 | +0.1% |
| CoCr_4.5 | 8.82 | 4.44 | 24.57 | 5.534 | 24.31 | 5.475 | +1.1% |
| CoCr_5.5 | 8.82 | 5.50 | 30.43 | 5.533 | 30.09 | 5.470 | +1.1% |

| Material | CSP (mm) | RSP | $\Delta$RSP from simulation |
|---|---|---|---|
| Bone | 7.09 | 1.435 | −2.2% |
| Al | 9.73 | 1.970 | −2.3% |
| Ti | 14.12 | 2.979 | −0.8% |
| CoCr_4.5 | 24.16 | 5.441 | 0.5% |

| x (mm) | Simulation (cm) | Measurement (cm) | Difference |
|---|---|---|---|
| −100 | 18.93 | 18.63 | −1.6% |
| −50 | 21.69 | 21.57 | −0.6% |
| 0 | 25.13 | 25.23 | +0.4% |
| 50 | 21.69 | 21.50 | −0.9% |
| 100 | 18.93 | 19.08 | +0.8% |

SYSTEMS AND METHODS FOR GENERATING MATERIAL MAPS FOR TREATMENT PLANNING USING MONTE CARLO METHODS

CROSS-REFERENCE TO RELATED APPLICATIONS

This application is the National Stage of International Application No. PCT/US2021/060162 filed Nov. 19, 2021, which claims the benefit of U.S. Provisional application Ser. No. 63/115,777 filed Nov. 19, 2020. The entirety of each of these applications is hereby incorporated by reference for all purposes.

BACKGROUND

The use of proton therapy (PT) for treatment of malignancies including but not limited to head and neck malignancies, brain tumors, skull-based chordoma and spine chordoma has been increasing in the recent years. With this wide spectrum of tumors being treated with PT, it is not uncommon for patients to have implants from reconstructive surgeries or dental procedures, such as vascular implants, orthopedic plates, screws, meshes, and prostheses, dental fillings and implants, etc. The presence of implants can complicate the delivery of proton therapy due to inaccurate characterization of both the implant and the surrounding tissues.

Current treatment planning systems for proton therapy rely on computed tomography (CT) images to calculate dose. Implants can cause severe artifacts in CT images. These artifacts can result in inaccurate characterization of the metal and surrounding tissues and thereby result in inaccurate dose calculations. Proposed solutions, such as overriding techniques and various metal artifact reduction algorithms, to address these inaccuracies have been time-consuming as well as ineffective in addressing the artifacts. For example, the detailed dimension and material properties of implants are generally not described in surgical notes or otherwise available, so a manual override of Monte Carlo (MC) dose calculation in treatment planning systems could be inaccurate or not feasible.

Thus, the presence of metal implants can be a risk factor to patient outcomes of PT. To avoid poor clinical outcomes, clinicians in most PT centers exclude those metal implant patients from their general guideline with case-by-case exemptions.

SUMMARY

Thus, there is a need for accurate determination of material composition, density, and geometry of implants, thus enabling PT treatment of a patient with a metal implant with better outcomes.

The disclosed embodiments may include computer-implemented systems and methods for generating a material map of a volume of interest. In some embodiments, the method may include receiving particle counting data and representation data for a volume of interest of a patient for one or more sessions. The method may further include determining most probable energy (MPE) using particle energy determined from the particle counting data. The method may also include generating a plurality of simulations that simulate interactions using different combination of properties for the volume of interest determined from the representation data and/or from a database to determine MPE for each simulation. The one or more properties may include geometry, material composition, and mass density. The method may also include comparing the MPE determined using the particle counting data to the MPE determined from each simulation. The method may further include selecting one simulation of the plurality of simulations based on the comparing. The method may also include generating a material map for the volume of interest using the one or more properties corresponding to the one simulation.

In some embodiments, the system may include one or more processors; and one or more hardware storage devices having stored thereon computer-executable instructions. The instructions may be executable by the one or more processors to cause the computing system to perform at least receiving particle counting data and representation data for a volume of interest of a patient for one or more sessions. The one or more processors may be further configured to cause the computing system to perform at least determining most probable energy (MPE) using particle energy determined from the particle counting data. The one or more processors may also be configured to cause the computing system to perform at least generating a plurality of simulations that simulate interactions using different combination of properties for the volume of interest determined from the representation data and/or from a database to determine most probable energy (MPE) for each simulation. The one or more properties may include geometry, material composition, and mass density. The one or more processors may be further configured to cause the computing system to perform at least comparing the MPE determined using the particle counting data to the MPE determined from each simulation. The one or more processors may be further configured to cause the computing system to perform at least selecting one simulation of the plurality of simulations based on the comparing. The one or more processors may also be configured to cause the computing system to perform at least generating a material map for the volume of interest using the one or more properties corresponding to the one simulation.

In some embodiments, the particle counting data may be proton data acquired by a proton counting detector. In some embodiments, the particle counting data may be carbon, neutron, photon, electron or other particle counting data.

In some embodiments, the volume of interest may include a metal implant.

In some embodiments, the comparing may include determining root mean square error (RSME) between the MPE determined using the particle counting data and the MPE for each simulation.

In some embodiments, the simulations may be Monte-Carlo (MC) simulations.

In some embodiments, the representation data may be acquired by a medical imaging system. The medical imaging system may include a proton computed tomography (CT) system and/or a photon CT system.

In some embodiments, a treatment plan may be generated using the material map. In further embodiments, a particle therapy system, such as a proton therapy system, may be controlled according to the treatment plan to perform particle (e.g., proton) therapy on the patient.

Additional advantages of the disclosure will be set forth in part in the description which follows, and in part will be obvious from the description, or may be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The disclosure can be better understood with the reference to the following drawings and description. The components in the figures are not necessarily to scale, the emphasis being placed upon illustrating the principles of the disclosure.

FIG. 3A shows a setup for in-air measurements in the presence of metal rod.

FIG. 6A shows a sample recorded events in TPX3 sensor that can be used in step 1. FIG. 6B shows a sample of processed cluster list that can be performed in step 2. FIG. 6C shows a sample linear energy transfer (LET) spectrum extracted from the cluster list that can be performed in step 3. FIG. 6D shows a corresponding energy spectrum of the LET spectrum shown in c that can be performed in step 4. FIG. 6E shows an illustration of how shift in energy spectrum can provide change in most probable energy ($\Delta$MPE) information that can be performed in step 5. FIG. 6F shows a comparison of $\Delta$MPE between measurements (dashed lines) to TOPAS simulations (solid lines) can identify potential inaccuracy in implant material maps that can be performed in step 6.

DESCRIPTION OF THE EMBODIMENTS

Figure 1:
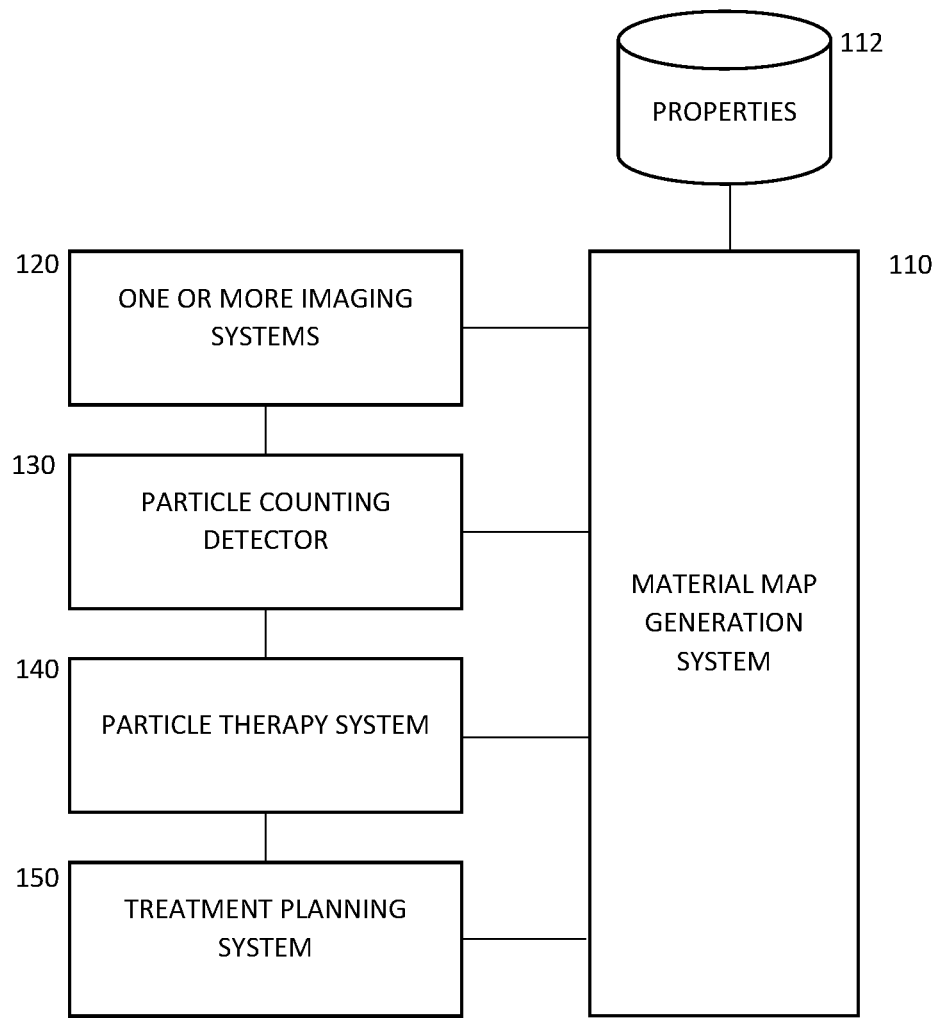
FIG. 1 illustrates an example of system environment for generating a material map for a volume of interest according to embodiments.

In the following description, numerous specific details are set forth such as examples of specific components, devices, methods, etc., in order to provide a thorough understanding of embodiments of the disclosure. It will be apparent, however, to one skilled in the art that these specific details need not be employed to practice embodiments of the disclosure. In other instances, well-known materials or methods have not been described in detail in order to avoid unnecessarily obscuring embodiments of the disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

This disclosure generally relates to techniques that can accurately and automatically determine material composition, density and dimensions of a volume of interest, for example, that includes an artificial object, for treatment planning using Monte Carlo (MC) methods. In some examples, the properties, such as material composition, density, and dimensions, of the target volume may be determined using most probable proton energy extracted from a linear energy transfer (LET) spectrum obtained by a proton counting detector. In this example, the most probable energy (MPE) may correspond to the energy value associated with the straight proton path among all paths.

The disclosure can use this data to generate a material map that can allow for accurate dose calculation, for example, by MC methods, for patients with implants or have shadowing artifacts or streaking in their CT scans. By generating accurate material maps required by MC methods, outcomes of proton therapy for patients with implants can be significantly improved thereby resulting in more patients with implants being candidates of receiving proton therapy.

While some examples of the disclosure may be specific to (properties of) a metal implant, it will be understood that this example is nonlimiting and that the methods and systems may be performed to determine properties of artificial objects of other materials (other than metal materials), such as PEEK, acrylic, lucite, lexan, among others, or any combination thereof. In addition, the methods and systems may be performed for any known material (material/composition listed in human reference materials defined by an International Commission of Radiation Units measurements report), unknown material (e.g., material/composition not listed in human reference materials defined by an International Commission of Radiation Units measurements report), or a combination thereof.

While some examples of particle (events) used to determine MPE for the material maps and corresponding particle (beam) therapy system are described using proton and proton (beam) therapy systems, it will be understood that these examples are intended to be non-limiting. In addition, the methods and systems may generate material maps for treatment plans and/or MC simulations of treatment using other (charged) particles/events, such as carbon, neutron, photons, among others, or any combination thereof. For example, the particle counter and particle therapy system may be specific to that particle (e.g., proton, photon, carbon, neutron, electron, etc.).

FIG. 1 depicts an example system environment 100 for generating a material map for treatment planning according to embodiments. In some examples, the material map may be a three-dimensional map of the volume of interest can be generated using the determined material composition, density and dimensions. The material map may be in terms of relative stopping power (RSP) (the energy loss of the beam in a material relative to that of water).

In some embodiments, the system environment 100 may include a material map generation system 110 that can process data acquired by one or more imaging systems 120 and/or the therapy system 130 to generate a material map of a volume of interest to be processed by a treatment planning system 140. For example, the one or more imaging systems 120 may include but is not limited to proton radiography, proton CT, photon CT (e.g., x-ray CT), among others, or any combination thereof. The one or more imaging systems 120 may be configured to acquire representation data of a volume of interest.

For example, if x-ray CT is used, the representation data may be a 3D model that contains the volume of interest. For example, a series of two-dimensional (2D) images can be taken from a 3D volume. Each 2D image can an image of a cross-sectional "slice" of the 3D volume. The resulting collection of 2D cross-sectional slices can be combined to create a 3D model or reconstruction of the patient's anatomy that contains the volume of interest.

In some embodiments, the system environment 100 may also include a particle therapy system 140. In some embodiments, the particle therapy system 140 may be configured to deliver charged particle therapy. For example, the proton therapy system 140 may be a proton therapy system configured to deliver proton therapy with one or more scanning and/or scattering methods, such as, pencil beam scanning, scatter beam, uniform beam scanning, among other scanning or scattering methods, or a combination thereof.

In some embodiments, the system environment 100 may also include a particle counting detector 130 configured to acquire particle data (can also be referred to as "particle counting data") for one or more sessions/angles. In some examples, the particle counting detector may be pixelated detector capable of detecting simultaneous events or particles at each pixel (for example, AdvaPIX-TPX3 (Advacam s.r.o., Czech Republic) pixelated detector) when exposed to a particle beam. By way of example, for proton therapy, the particle counting detector 130 may be configured to detect simultaneous events or particles at each pixel when exposed to a proton beam provided by a proton radiography system, proton therapy system and/or a proton CT system. In some examples, the particle counting detector 130 may be a part of the particle therapy system 140 and/or the imaging system(s) 120 and/or a treatment planning system 150.

In some embodiments, the material map generation system 110 may be configured to generate a material map based on MPE determined from the representation data acquired by one or more imaging systems 120 and the particle data acquired by the particle counting detector 130. In some examples, the material map generation system 110 may be configured to determine MPE using the one or more properties of the volume of interest determined from the particle data, for example, as described in FIG. 2. In some examples, the material map generation system 110 may be configured to generate (MC) simulations using combinations of properties of the volume of interest estimated/determined from the representation data and/or properties (e.g., geometry, material composition and/or mass density of known materials/implants) stored in the database 112 to simulate an interaction of the track of each individual ionizing particle (e.g., protons) through the volume of interest and sample the interactions. The material map generation system 110 may be configured to determine the one or more properties of the volume of interest based on comparisons of the MPE determined from each simulation of different combinations of properties and of the MPE determined from the particle data, for example, using root mean square error (RMSE). The material map generation system 110 may be configured to generate a material map using the one or more properties of the simulation, for example, that has MPE resulting in the lowest RMSE when compared to the MPE of the acquired particle data.

In some embodiments, the system environment 100 may include a treatment planning system 150 configured to generate a treatment plan using the material map generated by the system 110 and the representation data acquired by the one or more imaging systems 120. For example, the treatment planning system 150 can use the material map to determine the dose of beams and angles, for example, using MC dosing methods, that should be delivered, for example, by the particle therapy system 140. The operations and parameters of the particle therapy system 140, such as a proton therapy system, may be configured to be controlled to deliver particle therapy, such as proton therapy, according to the generated treatment plan.

In some embodiments, the material map generation system 110 may include any computing or data processing device consistent with the disclosed embodiments. In some embodiments, the material map generation system 110 may incorporate the functionalities associated with a personal computer, a laptop computer, a tablet computer, a notebook computer, a hand-held computer, an embedded device and/or any additional or alternate computing device/system. The system 110 may transmit and receive data across a communication network.

Although the systems/devices of the environment 100 are shown as being directly connected, the system 110 may be indirectly connected to one or more of the other systems/devices of the environment 100. In some embodiments, the system 110 may be only directly connected to one or more of the other systems/devices of the environment 100.

It is also to be understood that the environment 100 may omit any of the systems/devices illustrated and/or may include additional systems and/or devices not shown. It is also to be understood that more than one device and/or system may be part of the environment 100 although one of each device and/or system is illustrated in the environment 100. It is further to be understood that each of the plurality of devices and/or systems may be different or may be the same. For example, one or more of the systems of the systems may be hosted at any of the other devices. By way of example, the material map generation system 110 may be hosted at the particle therapy system 140 and/or the treatment planning system 150.

Figure 2:
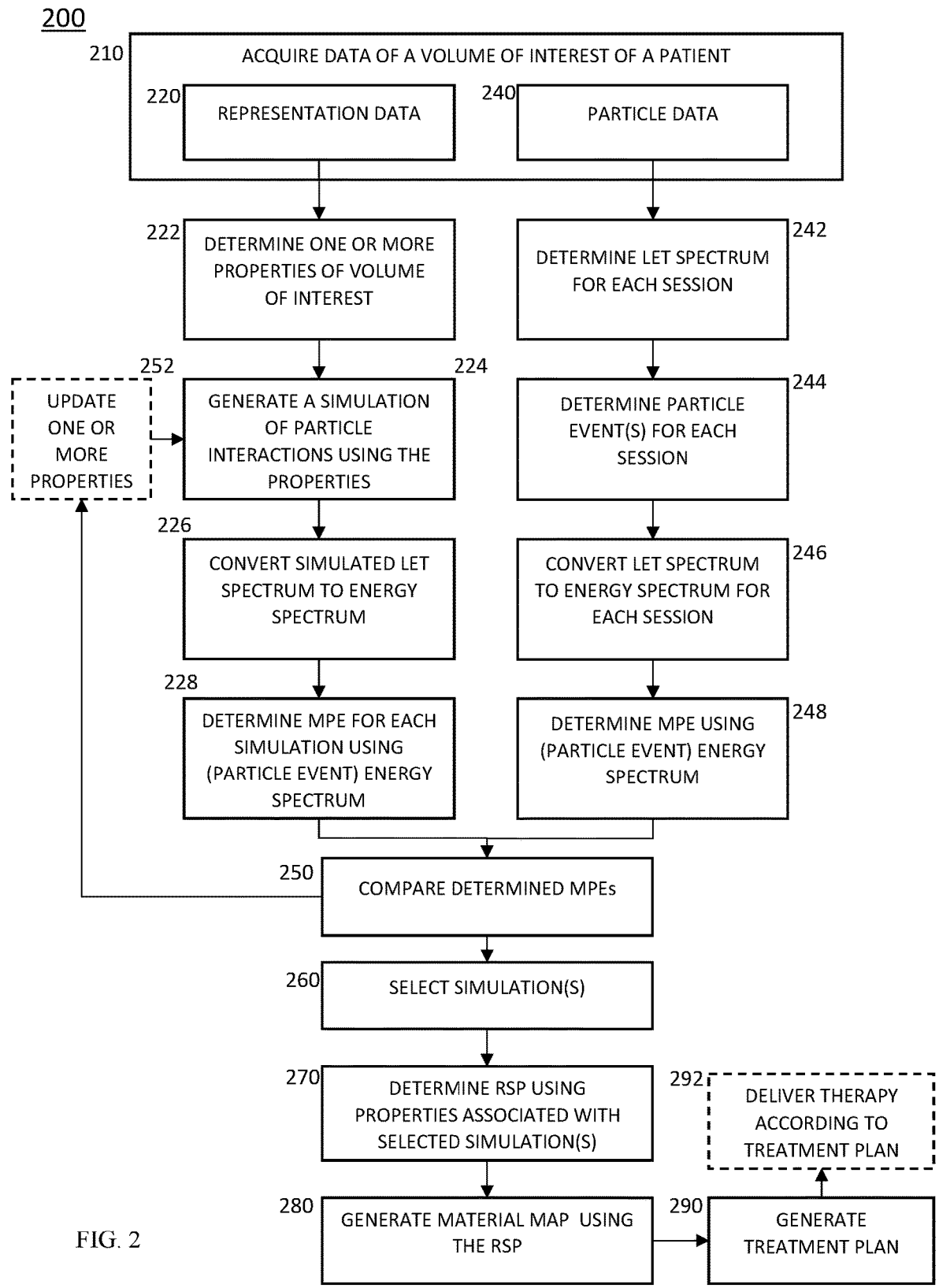
FIG. 2 is a flow chart illustrating an example of a method of generating a material map for a volume of interest according to embodiments.

FIG. 2 shows a flow chart according to embodiments. Operations described in flow chart 200 may be performed by a computing system, such as the device 110 described above with respect to FIG. 1 or a computing system described below with respect to FIG. 16. Although the flow chart 200 may describe the operations as a sequential process, in various embodiments, some of the operations may be performed in parallel or concurrently. In addition, the order of the operations may be rearranged. An operation may have additional steps not shown in the figure. In some embodiments, some operations may be optional. Embodiments of the method/architecture may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium.

FIG. 2 shows flow chart 200 200 illustrating examples of a method of generating a treatment plan using MPE according to embodiments. Operations in flow chart 200 may begin at block 210. At block 210, the system 110 may include acquiring patient data that includes a volume of interest (e.g., an implant). The volume of interest may be an area or structure that may be at risk of radiation exposure during treatment. For example, the patient data may include representation data 220 and particle data (can also be referred to as "particle counting data") 240 of the volume of interest.

In some embodiments, the representation data 220 may be a 3D model or reconstruction of the patient's anatomy that includes the volume of interest. In some examples, the representation data 220 may be acquired in a separate process from the particle data 240. For example, the representation data 220 may be acquired by a photon CT system before the particle data 240 (steps 242-248). By way of another example, the representation data 220 may be acquired by a photon CT system. In some examples, the representation data 220 may be acquired from the healthcare information systems, such as from the picture archiving and communication system.

In some embodiments, the representation data 220 may be acquired with the particle data 240 during the material map generating/treatment planning process. In some examples, the representation data 220 may be acquired by a proton CT system. For example, the representation data 220 may be reconstructed from the determined relative stopping power.

In some embodiments, the particle data 240 may include particle data for each particle track (also referred to as "cluster") detected by a sensor, such as the particle counting detector 130, for a plurality of sessions (angles) when the patient/volume of interest is exposed to particle beams, such as proton pencil beams, for example, provided by the imaging system(s) 120 and/or the particle therapy system 140, such as proton CT system and/or proton therapy system and/or proton radiography system. In some embodiments, the particle data 240 for each particle may include a count of each particle (e.g., photons, protons, electrons, etc.), and parameters associated with that particle, such as coordinates of interactions, size of cluster, magnitude of energy, track length associated with the particle.

In some examples, the particle data 240 may be acquired using the particle counting detector 130. In some examples, the particle data 240 may be processed by a tracking processing program associated with the detector 130. For example, the tracking processing program may process each cluster to determine the one or more parameters associated with that cluster. In some examples, the particle data 240 that was processed by the tracking processing program may be received at block 210.

Next, the system 110, may process the representation data 240 at blocks 220-228 and the particle data 240 at blocks 242-248. In some examples, steps 220-228 may be performed before steps 240-248. For example, the representation data 240 may be acquired at a time before the particle data 240 is acquired. By way of another example, the simulations using different combinations of properties and the MPE determined for each simulation may be performed before steps 240-248. In other examples, the steps 220-228 and 240-248 may be performed in parallel.

At block 222, the system 110 may determine one or more properties of volume of interest from the representation data 220. The one or more properties may include but is not limited to geometry, material composition, and mass density. For example, if the representation data 220 was acquired by a photon CT system, the system 110 may determine the one or more properties from the representation data 220 using known and available methods, such as a calibration curve. By way of another example, if the representation data 220 is acquired by a photon CT system, the one or more properties can be determined using the CT Hounsfield unit or DECT extract parameters presented in the image formats. By way of another example, if the representation data 220 was acquired by a proton CT system, the system 110 may determine the one or more properties using different image reconstruction algorithms.

At block 224, the system 110 may generate a (first) simulation that simulates particle interactions using the one or more properties from block 220 to determine LET spectrum specific to particle of interest (e.g., proton). In some examples, the simulations may simulate particle interactions in each angle/session and/or for all angles/sessions (entire 3D volume). In some examples, each simulation may simulate the track of each individual ionizing particle (protons) through the volume of interest and sample the interactions to determine the (proton only) LET spectrum that corresponds to the track averaged LET for protons. By way of example, the simulations may be generated using available MC methods, such as MC particle transport tool.

In some examples, at block 224, the system 110 may generate a plurality of simulations using different combination of the one or more properties to determine (particle specific) LET spectrum for each simulation. By way of example, the system 110 may use a combination of one or more properties stored in the database 112 and/or the one or more properties determined from the representation data 220 in the each simulation. In some examples, the one or more properties stored in the database 112 to be used in the different combinations of properties to be simulated may be pre-selected by MC simulations of clinic scenarios. In other examples, all of the properties stored in the database 112 may be used in different combinations that are simulated.

In some examples, the system 110 may iteratively determine the combinations for the simulations using RSME as discussed below with respect to blocks 250 and 252.

At block 226, the system 110 may convert the simulated LET spectrum to an energy spectrum for each simulation. For example, the energy spectrum may be derived from the LET spectrum, for example, using stopping power tabulated in National Institute of Standards and Technology (NIST) Pstar database. For example, for proton LET spectrum, the energy spectrum for each simulation would correspond to energy of the proton events.

Next, at block 228, using the energy spectrum, the MPE can be determined (for each session). For example, the MPE may represent the energy spectrum corresponding to the straight particle (proton) path for each session among all paths received from that session. In this example, MPE for each session may correspond to the energy spectrum with the highest value for that session. For example, for proton, the MPE may correspond to the proton energy spectrum with the highest value for that session. In parallel and/or after the representation data 220 is processed at blocks 222-228, the particle data 240 may be processed at blocks 242-248.

At block 242, the system 110 may determine LET spectrum for each session of the particle data 240 using one or more parameters for that session. For example, the parameters may include but is not limited to volume (i.e., corresponds to deposited energy in all pixels in the cluster), maximum energy value (i.e., corresponds to the highest per-pixel energy registered in the cluster/particle track), length, (i.e., corresponds to track length of the cluster across sensor surface), and standard deviation (i.e., corresponds to track width standard deviation along the track main axis). For example, the parameters may be used to determine track length for example, using known methods (e.g., equation 3 below) and the LET may be determined based on the determined track length and deposited energy (i.e., the registered energies in all pixels) for the particle track/cluster, for example, using known methods (e.g., equation 2 below).

Next, at block 244, the system 110 may determine one or more particle events (e.g., proton event(s)) for each session, for example, by filtering at least the LET spectrum to exclude signals from particles other than particle of the particle event (e.g., protons). For example, the particle of interest may be proton events. In some examples, the system 110 may filter the LET spectrum, the cluster size, and cluster height using stored optimal thresholds determined based on prior MC simulations, to reject non-proton events only without significant loss of relevant proton events In other examples, the particle of interest may be neutron or carbon or photon or electron.

Next, at block 246, the system 110 may convert the determined LET spectrum for the particle event(s) to the energy spectrum (for each session). For example, the energy spectrum may be derived from the LET spectrum, for example, using stopping power tabulated in NIST Pstar database. In some examples, a median filter may be applied to the converted energy spectrum to smooth the energy spectrum. For example, for proton events, the energy spectrum may correspond to the proton event(s) in each session.

Next, at block 248, using the energy spectrum, the MPE can be determined for each session. For example, the most probable energy may correspond to the X of the energy spectrum.

Next, at block 250, the system 110 may compare the MPE determined from each simulation (block 228) (for each session and/or entire 3D volume) to the MPE determined from the particle data (block 248) (for that session and/or entire 3D volume). In some examples, the comparing at block 250 may include determining RMSE using the estimated MPE (block 228) and determined MPE (block 248). In some examples, one or more parameters in addition to and/or in alternative to MPE based on the particle (proton) energy spectra may be used in the comparing at block 250. For example, the one or more parameters may include other reliable surrogate representations of energy spectra, for example, to save computation time, or other surrogate besides RMSE for the comparison using MC simulated and acquisition particle energy spectra . . .

In some examples, when the combination of properties are simulated iteratively, the method 200 may include the update step at block 252. At block 252, the system 110 may update one or more properties of the volume of interest after the comparison for each session. For example, the system 110 may update the values corresponding to the geometry, material composition, and/or mass density with one or more stored property values (e.g., the database 112). For example, combinations of geometry (possible length per dimension), material composition and mass density can be determined based on the comparison at block 250. In some examples, the system 110 may determine the one or more properties to use in a combination to be simulated at block 224 based on the determined RSME.

After one or more of the one or more properties is updated, the system 110 may repeat steps 224-228 for each (additional) combination of the one or more (updated) properties of the volume of interest (for each session or 3D volume). For example, the system 110 may generate a (second/additional) simulation using the additional combination of one or more (updated) properties at block 224 to determine MPE for (for each session or 3D volume) at block 228. Next, at block 250, the system 110 may then compare the MPE (for each session or 3D volume) for that simulation to the MPE for the particle data (that session or 3D volume) determined at block 248, for example, by determining RMSE for that comparison. In this example, the system 110 may repeat steps 224-250 for each (additional) combination of properties 252 identified by the system 110.

In some examples, as discussed above, steps at blocks 224-228 may be performed for all combinations of properties identified by the system 110 (and block 252 can be omitted). For example, steps at blocks 224-228 may be performed using all of the different combinations of geometry, material composition, and mass density in parallel. In this example, at block 250, the MPE determined at block 228 for each simulation may be simultaneously compared to the MPE determined at block 248, for example, using RMSE.

After the MPE determined for all combinations of properties identified by the system 110 (blocks 224-228) is compared to MPE for corresponding session (block 248) at block 250, the system 110 may select a simulation (for each session or 3D volume) based on the comparison at block 260. For example, the system 110 may select the simulation (for each session or 3D volume) that has lowest RMSE.

Next, at block 270, the system 110 may determine relative stopping power (RSP) for the volume of interest using the properties associated with the selected simulation (at block 260). For example, relative stopping power may be determined using the properties associated with the selected simulation for each session or 3D volume.

Next, at block 280, the system 110 may generate a material map using the RSP and the properties (material composition, density and dimensions) associated with the selected simulation (at block 260) for the volume of interest.

In some examples, the system 110 may output the generated material map. For example, the system 110 may display the generated material map.

In some examples, next, at block 290, the system 110 and/or treatment planning system 150 may generate a treatment plan using the generated material map (at block 290). For example, the system 110 and/or the system 150 may perform MC dose simulations using the generated material map to generate a treatment plan for particle therapy for the volume of interest. For example, for proton therapy, the treatment plan can be specific to proton therapy systems.

In some examples, the method 200 may optionally include the step at block 292. At block 292, the system 140 may cause delivery of a particle treatment therapy according to the treatment plan generated at block 290. By way of example, for proton therapy, a proton therapy system may cause delivery of proton therapy according to the treatment plan determined at block 290.

EXAMPLES

A study has been conducted using a proton counting detector and a proposed method to characterize artificial implant and human tissue mimicking materials with preliminary data to demonstrate the method's feasibility. The proposed method will provide information about dimensions of the implant and human materials in terms of cumulative stopping power (CSP), as well as their individual RSPs. CSP is the summation of multiplication of RSP by mass density weighted physical length of all voxelated materials along a beam path, i.e. water-equivalent thickness. Moreover, the data obtained using proposed method can be used for the validation of material maps provided by competing MAR and MECT techniques (Chang et al 2020b).

1. Materials and Methods 1.1. Proton Counting Detector: Data Acquisition

Each proton was tracked using fast, spectral imaging camera AdvaPIX-TPX3 (Advacam s.r.o., Czech Republic) which comes with advanced semiconductor pixel ASIC readout chip, Timepix3 (TPX3), bonded to 500 μm thick silicon. Total sensitive area of the detector is 14 mm×14 mm divided into a matrix of 256×256 energy sensitive pixels with pixel pitch of 55 μm. The AdvapPIX-TPX3 (TPX3) pixelated detector exhibits a unique property: ability to detect simultaneous events at each pixel to overcome the charge sharing effect in traditional photon counting detectors (Xu C, Danielsson M and Bornefalk H, 2011, Evaluation of energy loss and charge sharing in cadmium telluride detectors for photon-counting computed tomography IEEE Trans. Nucl. Sci., 58:614-25). The time-of-arrival can be identified with a precision of 1.56 ns (Granja C et al., 2018, Resolving power of pixel detector Timepix for wide-range electron, proton and ion detection, Nucl. Instrum. Methods Phys. Res., A908: 60-71), whereas the time-over-threshold of the respective pixel can be measured. Each ionizing particle generates a signal that involves multiple pixels forming a cluster of pixels which will have unique characteristic patterns, i.e. morphology, in the pixelated semiconductor sensor. These clusters are a result of convolution of the deposited charge along the particle's path, which spreads the deposited charge into adjacent pixels. The extent of this spread depends on the applied bias and the distance to the pixelated electrode. The detector was operated at the lowest bias recommended during calibration (80 V for the 500 μm thick Si sensor). Even though the effect of temperature changes on TPX3 is limited and can be corrected (Turecek D and Jakubek J, 2013, Dependence on temperature and pixel threshold of the calibration for the Timepix detector and its correction method, J. Instrum., 8: C01010-01010), cooling fans were used to keep the sensor temperature below 25° C.

TPX3 detector can be operated both in data-driven mode, i.e. 'Pixel mode' in the TPX3 manual, and in traditional frame mode. When using frame mode to measure the energy, each frame length must be selected low to allow distinguishing the particles from each other. If the frame length is inappropriately chosen, then particles will overlap making it not possible to determine the real energy. To avoid this and to increase the efficiency, the TPX3 in data-driven mode was used. In this Pixel mode, the counter is incremented continuously if the signal is above threshold, i.e. the counter is used as Wilkinson type ADC allowing direct energy measurement in each pixel. The detection threshold can be expressed in terms of deposited energy which is ~3 keV at the pixel level. The dark-current free detection enables measurements of low values of linear energy transfer (LET) with high precision. Owing to the per-pixel calibration, an adjustable threshold is made in each pixel allowing a detection efficiency close to 100% for heavy charged particles, making this detector unique and suitable for our study. The threshold calibration and the pixel-by-pixel calibration was performed by the company, Advacam (Jakubek J, 2011, Precise energy calibration of pixel detector working in time-over-threshold mode, Nucl. Instrum. Methods Phys. Res., A, 633: S262-6). A vendor supplied calibration curve was applied for each measurement of per-pixel energy. The details of vendor calibration can be found in Jakubek J, Granja C, Hartmann B, Jaekel O, Martisikova M, Opalka L and Pospisil S, 2011, Selective detection of secondary particles and neutrons produced in ion beam therapy with 3D sensitive voxel detector, J. Instrum., 6: C12010-12010.

For precise particle tracking, TPX3 needs to operate at flux levels of $10^4$ protons/cm$^2$/s and below. Our proton pencil beam scanning (PBS) system has intensity of (2-5)×$10^6$ protons/3 ms at minimum spot MU. Hence, to reduce the intensity of the PBS, 2 mm diameter pinhole collimator was utilized. The collimator not only reduces total proton flux by order of magnitude per spot but also increases measurement accuracy when sampling small-dimension (~5 mm in diameter) metals.

The software package Pixet Pro, version 1.6.1, was used to operate the detector, to set the parameters and to control the readout, data acquisition and recording. The detector was connected to a standard laptop using a USB 3.0 cable. The data saved in ASCII files were then pre-processed using an additional package of the Pixet (Turecek D, Jakubek J and Soukup P, 2016, USB 3.0 readout and time-walk correction method for Timepix3 detector, J. Instrum., 11: C12065-12065). Detector data processing will be described in section 1.3. More details about how analysis is done to extract different parameters beyond our study can be found in Holy T et al, 2008, Pattern recognition of tracks induced by individual quanta of ionizing radiation in Medipix2 silicon detector, Med. Phys. 19:287-90; Heijne E H M et al, 2010, Vectors and submicron precision: redundancy and 3D stacking in silicon pixel detectors, J. Instrum., 5: C06004; Bouchami J et al, 2011, Measurement of pattern recognition efficiency of tracks generated by ionizing radiation in a Medipix2 device, Nucl. Instrum. Methods Phys. Res., A, 633: S187-9; Akiba K et al, 2012, Charged particle tracking with the Timepix ASIC, Nucl. Instrum. Methods Phys. Res., A, 661:31-49, Opalka L et al 2013 Linear energy transfer and track pattern recognition of secondary radiation generated in hadron therapy beam in a PMMA target, J. Instrum., 8 C02047; Perl J, Shin J, Schumann J, Faddegon B and, Asbah N et al, 2014, Measurement of the efficiency of the pattern recognition of tracks generated by ionizing radiation in a TIMEPIX detector, J. Instrum., 9: C05021; and Bergmann B et al, 2017, 3D track reconstruction capability of a silicon hybrid active pixel detector, Eur. Phys. J., C77: 421.

1.2. Measurement Setup and Novel Method to Derive RSP from CSP

In the context of this work, three scenarios were considered: (1) in-air measurements in the presence of a metal rod, FIG. 3(A), (2) measurements of energy perturbations in the presence of metal implants: study with a CIRS (Computerized Imaging Reference Systems, Inc., Norfolk, VA) M701 Adult Phantom (CMAP), FIG. 3(B), (3) Sampling of CSP of the CMAP at different locations, FIG. 3(B).

For scenario 1, a 70 MeV single proton pencil beam was incident on a 2 mm diameter pinhole in a 50 mm thick brass collimator. The collimated beam then passes through a rod of either Ti, CoCr, and aluminum (Al), or bone. The Ti, Al, and bone rods have a nominal diameter of 5, and CoCr rods with diameters of 4.5 and 5.5 mm (Medtronic; Stryker) are used. Vendor-provided elemental composition for both CoCr rods is 66% Co, 28% Cr and 6% Mo and their mass density was measured as 8.82 g cm$^{-3}$. All masses were determined using a high precision, ±0.01 g, scale. All diameters were measured with an industrial caliper of sensitivity ±0.05 mm. Furthermore, there are some additional uncertainties in mass densities due to tapered end and the imprecise measurement of the length (50 mm for 4.5 mm CoCr and 70 mm for 5.5 mm CoCr) of bent CoCr rods. An initial in-air measurement in which there is no metal or bone in the collimated beam's path was also acquired. In all the acquisitions, the detector was moved incrementally by 14 mm along the detector plane from −5 to +5 cm to register the energy spectra of the scattered protons. The reason for 14 mm translation is that the size of the detector sensor is 14 mm and translating it by that much achieves continuous acquisition of scattered protons. The comparison of whole curves can detect the most probable energy of the scattered protons beyond that of the central axis along the collimator pinhole and is robust towards measurement setup uncertainties.

Figures 3A, 3B:
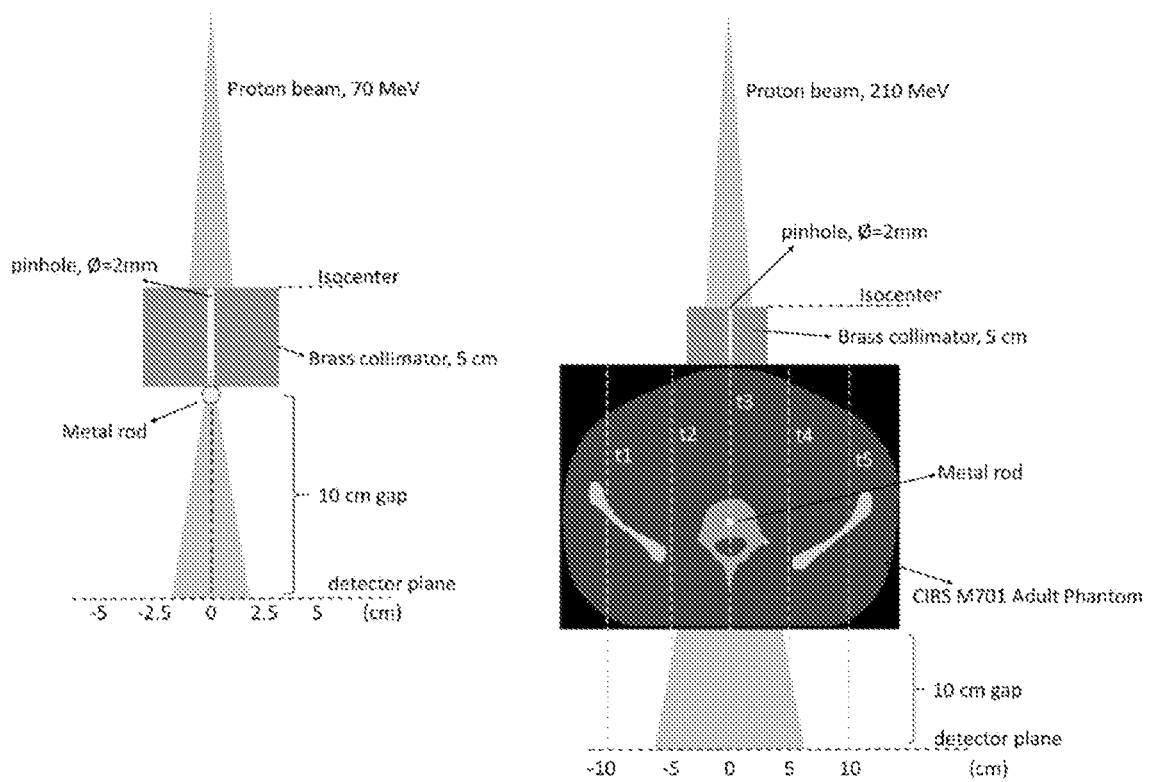
FIGS. 3A and B show examples of a setup for measurements used in an example.
FIG. 3B shows a setup for measurements in CIRS (Computerized Imaging Reference Systems, Inc., Norfolk, VA) M701 adult phantom (CMAP) with dashed lines showing the locations of cumulative stopping power (CSP) sampling of phantom material. Tissue composition of sampling paths, t1-t5, is shown in FIG. 5.

For CMAP study, the setup was very similar to the in-air measurements, except the CMAP was situated right after the pinhole collimator and the metal rod was placed inside the CMAP, as seen in FIG. 3(B). Energy of the incident proton beam was 210 MeV. CMAP measurements with 5.5 mm CoCr were not performed as the diameter of the insert in the CMAP is 5 mm. An initial measurement in which there is no metal or bone in the CMAP was acquired. Just like in in-air measurements, for this setup the detector was moved incrementally by 14 mm along the detector plane from −5 to +5 cm to register the energy spectra of the scattered protons.

Figures 4, 5:
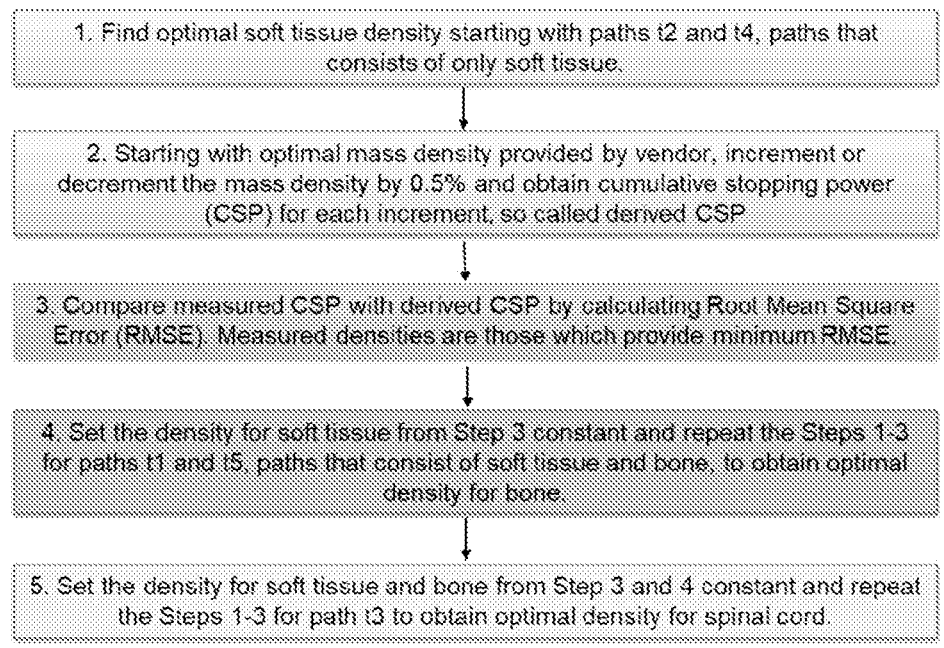
FIG. 4 shows the steps to determine measured densities of soft tissue, spinal cord, and bone sampling of the CMAP performed in the example.
FIG. 5 shows a table of physical lengths, measured from CT images in treatment planning system (TPS), of tissues used to calculate derived CSP in the example.
Figures 6A, 6B:
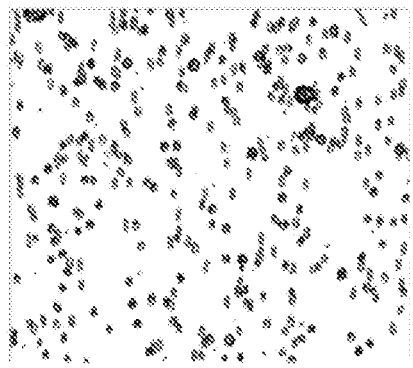
FIGS. 6A-F shows examples that can be used in a workflow of the method proposed in the example.
Figure 6C:
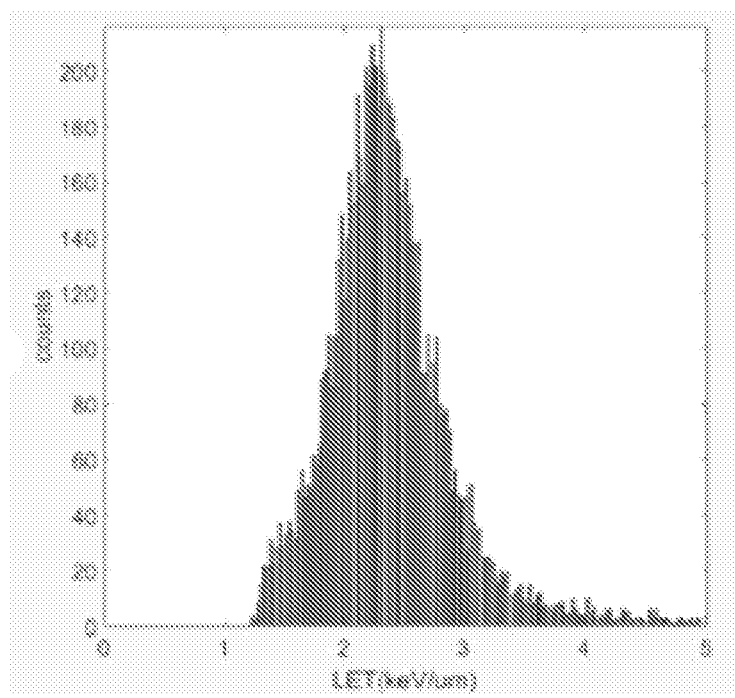
Figure 6D:
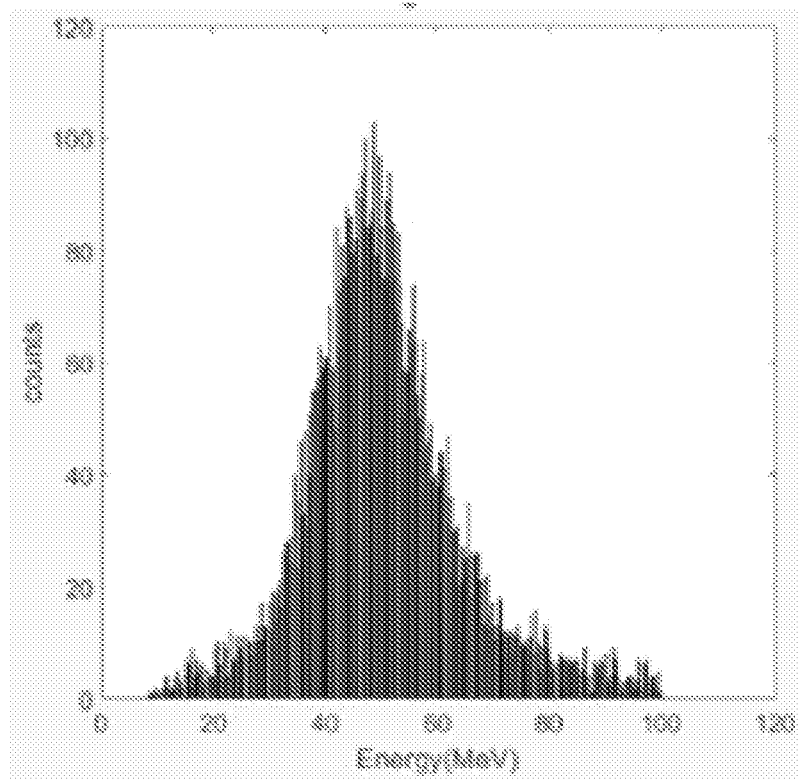
Figure 6E:
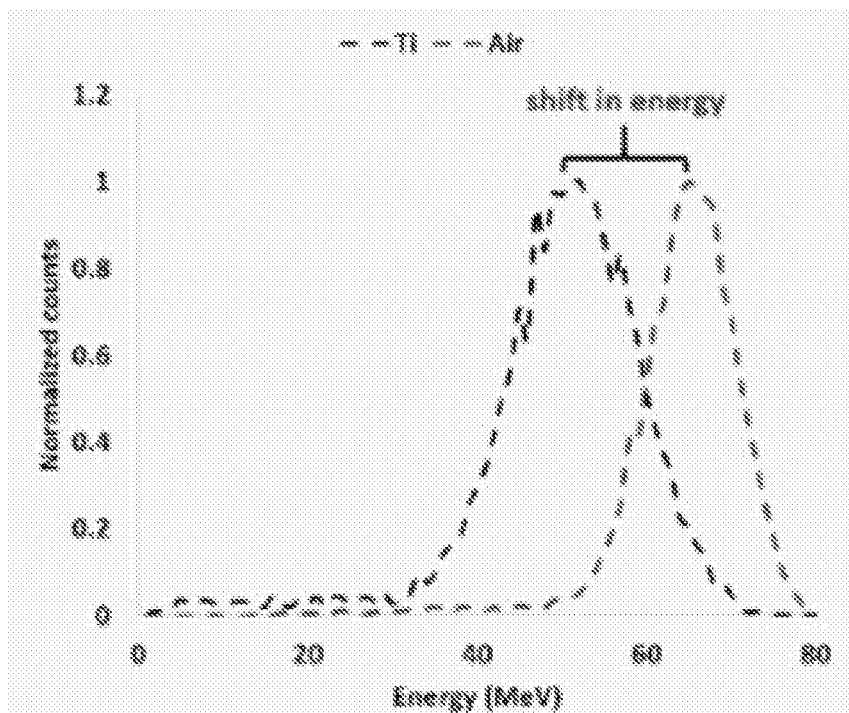
Figure 6F:
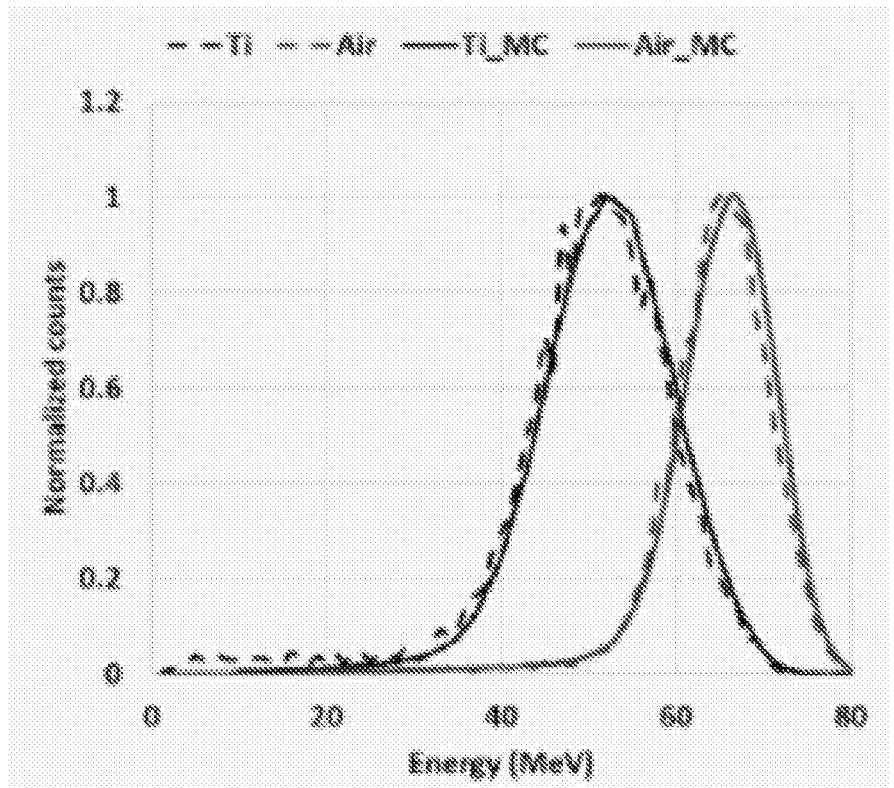

In addition to the scattered proton energy spectra, sampling of the CMAP at locations shown with dashed lines in FIG. 3(B) was also performed. Sampling was performed to show that the detector can perform RSP mapping, and that this method can be used to determine mass densities. Using vendor provided elemental composition, measured mass densities was checked if it agreed with vendor provided values. The derivation steps are illustrated in the flowchart in FIG. 4. Derived CSP is summated from voxelated RSP according to CT images for beam paths and provided in table in FIG. 5, of tissues. The physical length approximates most likely path (MLP), as described in Schulte R W, Penfold S N, Tafas J T and Schubert KE, 2008, A maximum likelihood proton path formalism for application in proton computed tomography, Med. Phys., 35:4849-56, and Brooke MD and Penfold SN, 2020, An inhomogeneous most likely path formalism for proton computed tomography, Phys. Med., 70:184-95, which elongate the physical length with broadened and scattered beam, leading to the uncertainty of absolute value of RSP. Since we compared MPE between measurement and simulation to derive the relative difference of RSP and mass densities, the relative differences would not be affected.

To optimize mass densities, measured CSP was compared with derived CSP by calculating root mean square error (RMSE), defined as:

$$RMSE = \sqrt{\frac{1}{n}\sum_{i}^{n}\left(CSP_i^m - CSP_i^d\right)^2}, \quad (1)$$

where $CSP_i^m$ and $CSP_i^d$ are measured and derived (by changing mass density by 0.5%) CSPs of ith sampling location and n is the number of sampling locations available for analysis. Measured mass densities are those which provide minimum RMSE. After mass density of soft tissue is established in paths t2 and t4, which consisted of soft tissues only, steps 1-3 were from FIG. 4 for paths t1 and t5 to find density for bone. Finally, after soft tissue and bone densities are known, we repeated the steps for path t3 to obtain density for spinal cord.

1.3. Proton Counting Detector Data Processing and Workflow of Obtaining MPE from LET When a particle reaches the detector's sensor, the charge diffuses in both horizontal and lateral directions and spreads over several pixels creating the so-called 'cluster', identified as a single particle track. The shapes of the clusters are analyzed by a novel high-resolution micro-scale pattern recognition algorithm that can overcome charge sharing effect. Based on the cluster analysis, several parameters of a cluster can be obtained: energy, length, area, height, etc. The cluster energy is the sum of energy in pixels making up that cluster. Length is the track length of the cluster across sensor surface. The number of pixels within a cluster is called cluster area, A. The maximum energy deposited in a pixel inside the cluster is named cluster height, H. Data is acquired in energy mode where, for each proton, position, energy, time of arrival, and track shape are measured. After data acquisition, detailed track processing is performed based on morphology of each cluster and list data. By using the Track Processing Pixet software, we obtained 31 columns of data corresponding to 31 parameters that are extracted as a result of the analysis. Out of extracted data entries per cluster, we used Volume, MaxVal, Length and StdDevLinDist, which stand for deposited energy in all pixels in the cluster, the highest per-pixel energy registered in the cluster, track length of the cluster across sensor surface, and track width standard deviation along the track main axis, i.e. $\sigma_i$ in equation (3), respectively. At last, HL, Height to Length ratio (=Max Val/Length in parameter list) and H were extracted to help with the filtering process of the extracted energy spectra.

FIGS. 6A-F shows the workflow of the proposed method to characterize implant and human materials. In step 1, shown in FIG. 6A, the TPX3 records each cluster of energy deposition for a given particle in a 256×256 pixelated sensor. Spectroscopic and directional information (i.e. LET, elevation angle, type) are extracted from supplementary in-house pattern analysis of the particle tracks. Of importance is the LET spectrum. Because energy spectra are derived from LET spectra (see Step 4 shown in FIG. 6D), it is extremely important that LET distribution is obtained correctly. For accurate LET measurement, the detector should be oriented at an angle to incoming particles for enhanced sampling of the track length and per-pixel energy deposition, preferably 45 degrees or higher (Granja C et al, 2018, Resolving power of pixel detector Timepix for wide-range electron, proton and ion detection, Nucl. Instrum. Methods Phys. Res., A, 908:60-71). For the ith cluster, the LET is calculated according to equation (2):

$$LET_i = \frac{E_i}{(L_{3D})i}, \quad (2)$$

where $E_i$ is the deposited energy in the ith cluster and $(L_{3D})i$ is the 3D track length of the ith cluster. $E_i$ is given by the sum of registered energies in all pixels in the ith cluster. Applying Pythagorean theorem to $L_{3D}$, $L_{2D}$ and t and empirically accounting for the overestimation of $L_{2D}$ due to charge sharing inherently involved in simultaneous charge collection among multiple pixels, 3D track length is obtained from the following:

$$(L_{3D})_i = \sqrt{((L_{2D})_i - c^*\sigma_i)^2 + t^2}, \quad (3)$$

where $(L_{2D})_i$ is the track length of the cluster across sensor surface, t is the thickness of the detector, 500 μm, $\sigma_i$ is the fitted track width standard deviation along the track main axis, and c is the track charge sharing coefficient determined to be 2.5 from experimental accelerator beam calibrations (Granja C et al, 2021, Wide-range tracking and LET-spectra of energetic light and heavy charged particles, Nucl. Instrum. Methods Phys. Res., A, 988:164901). When calculating LET, a particle (responsible for a cluster) is assumed to traverse through the detector sensor. Because the incoming proton beam is contaminated with neutrons, photons, electrons and heavier fragments, filtration based on cluster size, LET, and cluster height needs to be implemented to exclude signals from particles other than protons. Three steps of filtration were used in combination to exclude signals from particles other than protons. Firstly, because we know the LET of incident protons in each scenario, 70 and 210 MeV, we can apply basic LET filtering where LETs lower than 1.774 keV μm$^{-1}$ (LET of 70 MeV in Si) and 0.819 keV μm$^{-1}$ (LET of 210 MeV in Si) was disregarded. Moreover, we prior information (from TOPAS simulation) about expected LET after the traversed media. This information can also be used to tailor the filtering. Secondly and thirdly, as suggested in Granja C et al, 2018, Resolving power of pixel detector Timepix for wide-range electron, proton and ion detection, Nucl. Instrum. Methods, Phys. Res., A, 908: 60-71, filtering based on H and HL was performed. Suggested value ranges for H and HL to filter out high energy proton events are 140-700 keV and 0.14-0.55 keV μm$^{-1}$ respectively according to Granja et al (2018). Detailed classification of radiation events in the TPX3 detector is described elsewhere (Granja et al 2018).

After determination of track lengths, energy spectra are derived from LET spectra using stopping power tabulated in National Institute of Standards and Technology (NIST) Pstar database. To reduce noise and avoid non-proton contamination, median filter was applied to smooth the converted energy spectra from LET measurements in FIGS. 7 and 9. The geometric and RSP information can then be extracted from the energy spectra. Energy resolution of 0.1 MeV was used in the spectra to achieve implant geometric resolution to the order of 0.1 mm. To increase the conversion accuracy from LET to proton energy, incident protons of low energies, such as 70 MeV in FIG. 3(A), are used when possible. To quantify the RSP of a metal rod, we used the shift in the most probable energy (MPE) from the initial condition (i.e. measurement without an insert) as shown in Step 5 of FIG. 6E. CSP and metal RSP are calculated from energy spectrum at position x=0 mm, i.e. along central axis. The rationale for using the MPE instead of average energy is that the shape of the energy distribution is not symmetric and occasionally the spectrum features two peaks making the use of average energy erroneous. In comparison to average energy, MPE is more robust to imperfect low energy spectra or double peaks with a second probable path because MPE reflects the straight proton path among all paths.

Finally, after all post-processing, measurements results are compared to simulation results for validation. The MC code, Tool for Particle Simulation (TOPAS), version 3.1.p2 (Perl J, Shin J, Schumann J, Faddegon B and Paganetti, H, 2012, TOPAS: an innovative proton Monte Carlo platform for research and clinical applications, Med. Phys., 39:6818-37), was used to simulate the proton transport. TOPAS accurately predicts dose and fluence distributions in a variety of geometries in the energy range used in this study and it has been validated numerous times (Lin L, Kang M, Solberg T D, Ainsley C G and McDonough J E, 2014, Experimentally validated pencil beam scanning source model in TOPAS, Phys. Med. Biol., 59:6859-73; Lin L et al al, 2017, A benchmarking method to evaluate the accuracy of a commercial proton monte carlo pencil beam scanning treatment planning system, J. Appl. Clin. Med. Phys., 18:44-9). Pencil beam characteristics like spatial beam spread, angular divergence, coefficient of correlation and energy spread were modeled as recommended in Huang S, Kang M, Souris K, Ainsley C, Solberg TD, McDonough J E and Simone CB 2nd and Lin L, 2018, Validation and clinical implementation of an accurate Monte Carlo code for pencil beam scanning proton therapy, J. Appl. Clin. Med. Phys., 19:558-72, and conditions of the simulation were set according to the methods described previously elsewhere (Charyyev S, Artz M, Szalkowski G, Chang C W, Stanforth A, Lin L, Zhang R and Wang C C, 2020, Optimization of hexagonal-pattern minibeams for spatially fractionated radiotherapy using proton beam scanning, Med. Phys., 47:3485-95). The geometry as shown in FIG. 3 is accurately reproduced in TOPAS. The CMAP geometry is fed into the simulation in DICOM format. We did not use conventional HU to material conversion (Schneider W, Bortfeld T and Schlegel W, 2000, Correlation between CT numbers and tissue parameters needed for Monte Carlo simulations of clinical dose distributions, Phys. Med. Biol., 45:459-78) that is built in TOPAS. Instead, elemental composition and mass density of the CMAP are overridden with vendor provided and measured values (Chang CW, Charyyev S, Harms J, Zhang T, Leng S, Zhou J, Yang X and Lin L, 2020b, Using a novel MECT simulation framework to derive tissue and implant material maps for proton Monte Carlo dose calculation Med. Phys. submitted). All TOPAS simulations were run on Chameleon, a testbed for computer science research and education (Keahey K et al, 2021, Proc. of the 2020 USENIX Annual Technical Conf. (USENIX ATC '20), 2020) (USENIX Association)).

2. Results 2.1. In-Air Measurements of Insertable Rods

Figure 7:
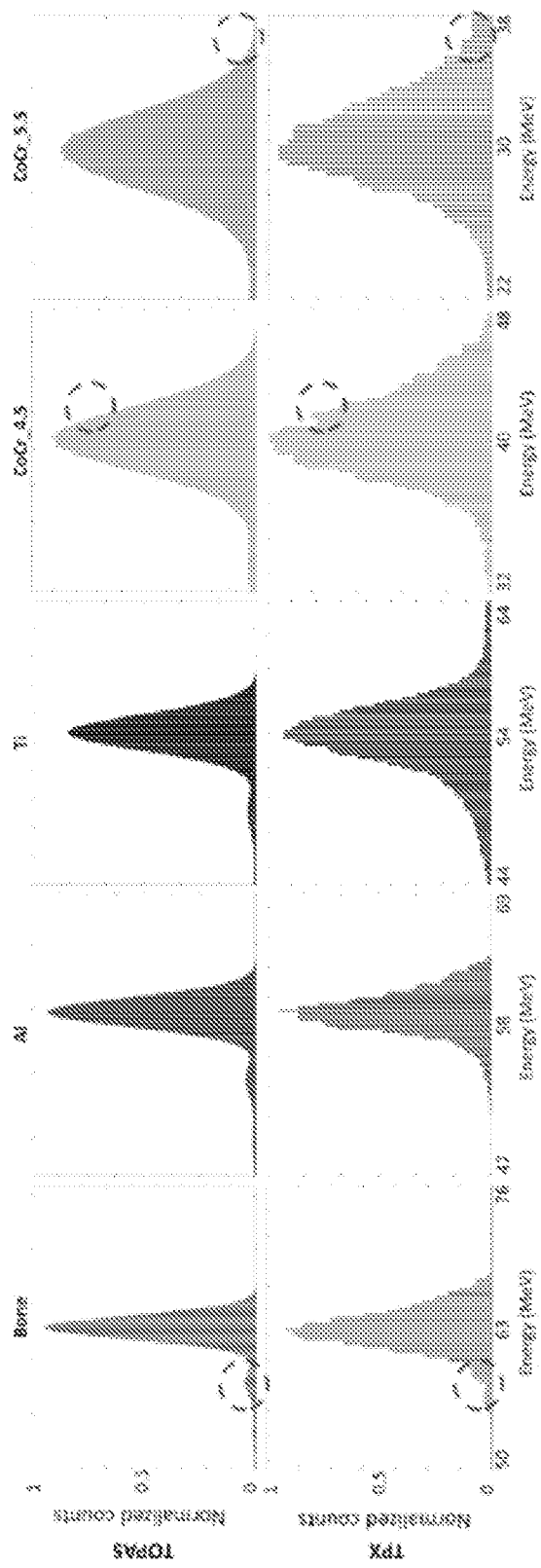
FIG. 7 shows energy spectra at position x=0 mm derived from the in-air study for bone, aluminum (Al), titanium (Ti) and two cobalt chromium (CoCr) metal rods in the example. The dashed circles represent discrepancies between simulations and measurements later.

FIG. 7 depicts the energy spectra for the in-air study positioned along the central axis, for bone, Al, Ti and two different CoCr rods. The top row shows the results for TOPAS simulations and in the bottom row are the results for TPX3 measurements. Proton counting detector measurement agrees with TOPAS simulation except the circled area despite median filter to reduce impacts from noise and non-proton contamination. To address residual disagreement in converted proton energy spectra, we propose using MPE in FIG. 8, instead of average energy to derive RSP, a first order approximation for material characterization required in MC.

Figure 8:
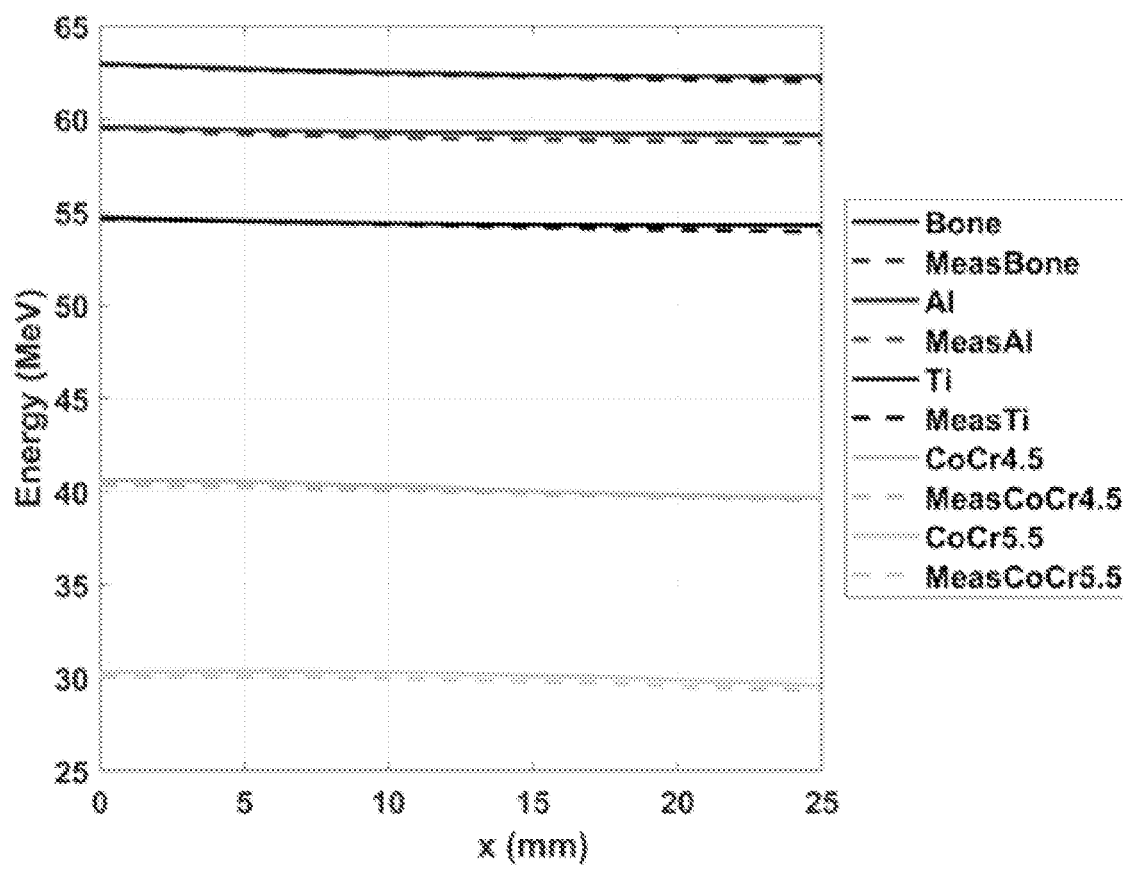
FIG. 8 shows a plot of MPE versus lateral position, in-air study, for bone, Al, Ti and two CoCr metal rods in the example.

FIG. 8 shows the MPE (obtained from energy spectra) versus lateral position for a 5 mm diameter rod of bone, Al, Ti and two CoCr rods of 4.5 mm and 5.5 mm diameters. Solid lines represent TOPAS simulations and dashed lines represent TPX3 measurements. The data in the negative x-axis is symmetric to the positive x-axis. For in-air measurements, fewer and fewer protons are making it to the detector as position progresses laterally. We limited scattered protons to 25 mm lateral position to avoid poor statistics seen at positions beyond that. Therefore, results at those positions are excluded from FIG. 8.

Figures 10, 11:
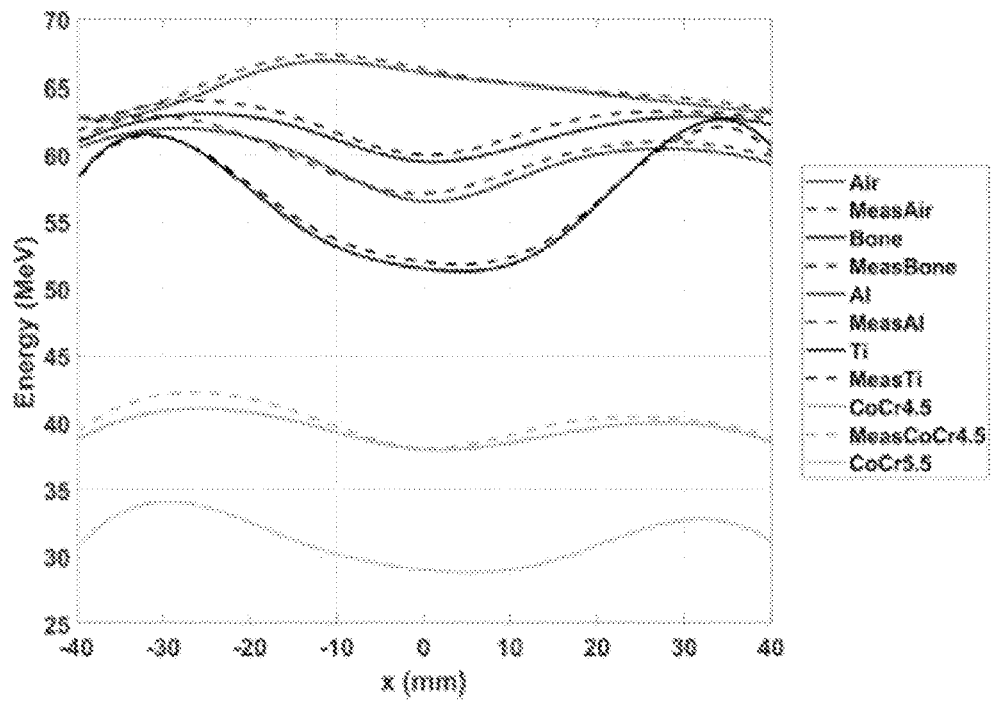
FIG. 10 shows a plot of MPE versus lateral position for air, bone, Al, Ti and CoCr scattered from CMAP in the example.
FIG. 11 shows a table of CSP and RSP results for bone, Al, Ti and two CoCr metal rods, in-air study in the example.

The CSP and insert rod RSP results for in-air measurements are listed for bone, Al, Ti and CoCr in table shown in FIG. 11. Values were calculated using the MPE shifts as shown in Step 5 of FIG. 6E and physical lengths in table shown in FIG. 5 and measured mass densities and diameters in table shown in FIG. 11. Simulated and measured RSPs agree within 1.1% using vendor provided elemental composition and measured mass densities.

2.2. Measurements of Insertable Rods in CMAP

Figure 9:
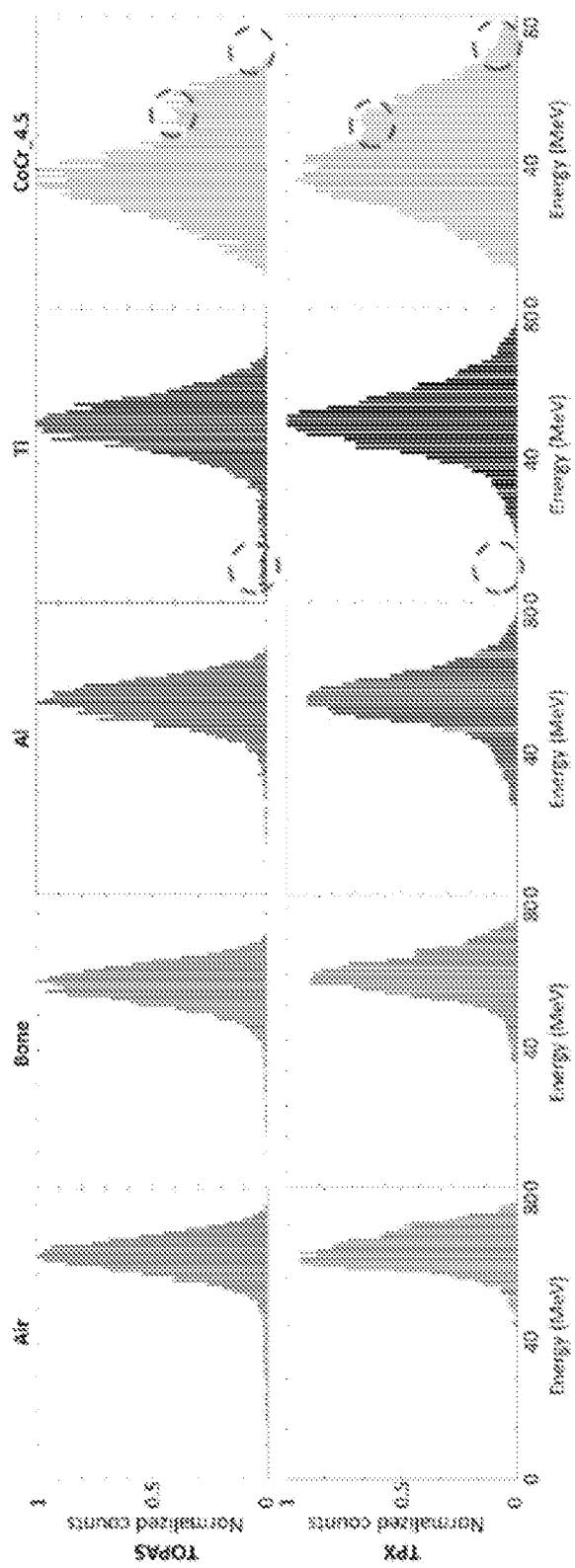
FIG. 9 shows energy spectra at position x=0 mm derived from CMAP study for air, bone, Al, Ti and CoCr in the example.

FIG. 9 illustrates the energy spectra for the CMAP study at position x=0 mm, i.e. along central axis, for air, bone, Al, Ti and CoCr. The top row shows the results for TOPAS simulations and the TPX3 measurements are shown in the bottom row. Measurements agree with simulation except the circled area. Residual disagreement remains of the secondary peak, i.e. the value and height of the secondary probable energy, despite median filter and MPE methods.

FIG. 10 shows, the MPE (obtained from energy spectra) versus lateral position for air, bone, Al, Ti and CoCr. Solid and dashed lines represent TOPAS simulations and TPX3 measurements, respectively. A simulation result for 5.5 mm CoCr, solid cyan line, is also included in FIG. 10 to compare with 4.5 mm CoCr, green line, to show the extent of how 1 mm difference in a dense metal like CoCr can yield significant energy perturbations.

Figures 12, 13:
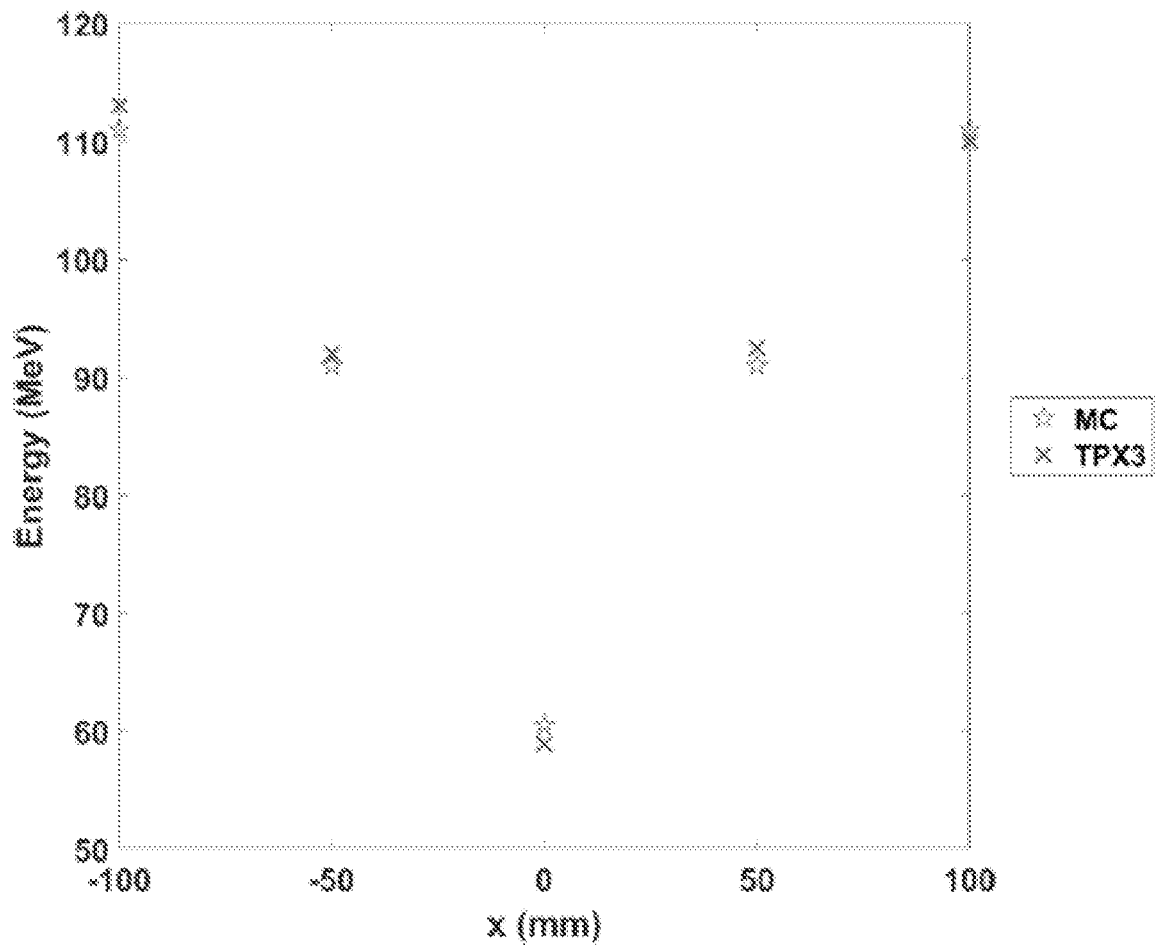
FIG. 12 shows a table of Measured CSP and insert rod RSP results for CMAP study in the example.
FIG. 13 shows a plot of MPE at 5 different sampling locations of CMAP: −100, −50, 0, 50, 100 mm in the example.

Listed in table shown in FIG. 12 are the CSP and RSP results for CMAP study obtained for bone, Al, Ti and CoCr using the MPE shifts as explained in Step 5 shown in of the section 1.3. Simulated and measured RSPs agree within 2.3%.

2.3. CMAP Multi-Path Sampling

Figures 14, 15:
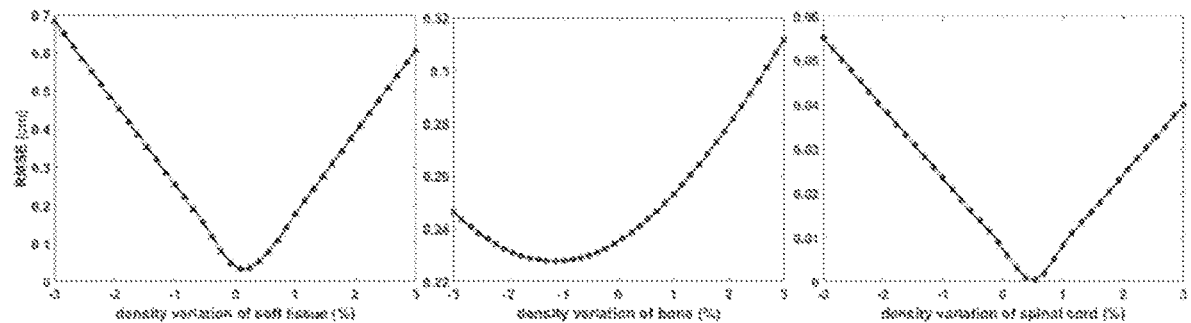
FIG. 14 shows a plot of root mean square error (RMSE) as a function of variation in density from vendor provided density for different tissues (soft tissue, bone and spinal cord) that make up CMAP in the example.
FIG. 15 shows a table of corresponding CSP results for the t1-t5 paths in FIG. 13.

TPX3 was able to sample CMAP material and measure associated CSP reasonably well. FIG. 13 illustrates the MPE at 5 different locations: −100, −50, 0, 50, 100 mm as previously indicated by dashed lines in FIG. 3(b). Pentagram and cross marks correspond to TOPAS calculated and TPX3 measured energies, respectively. Corresponding CSP values are summarized in table shown in FIG. 15. The largest difference, ~3 mm, in CSP was observed at location x=−100 mm. Unlike measurements as in 2.1 and 2.2, for sampling of CMAP, the beam and the detector were always aligned on the same axis. Sampling was performed by shifting the CMAP by 5 or 10 cm to the left or right. FIG. 14 illustrates the RMSE as a function of variation in mass density for different tissues (soft tissue, bone, and spinal cord) that make up CMAP. To achieve minimum RMSE, the optimal mass densities for tissue, spinal cord and bone are 1.06, 1.07 and 1.57 g cm 3 and within 1% from vendor-provided nominal densities. Sharp valleys in FIG. 14 proved that our method of determining RSP from RMSE of multiple CSP are robust for multiple materials in phantom.

Discussion

Our preliminary data have demonstrated that it is feasible to use the MPE method to the proton counting detector to derive the material maps of metal implants as well as validation of material information of human tissue mimicking materials. Mass density affects the height but not width of whole MPE curves, but the implant diameter selectively affects MPE curve both height and width of implant impacted local regions. Therefore, the contributions from mass density and implant diameter discrepancies can be separated. A novel methodology using MPE has been developed to derive the metal implant diameter by comparison of measurement with MC simulation to improve RSP accuracies with minimum RMSE of multiple CSP, a first order approximation for proton imaging. In the context of this work, material differentiation is limited to implant materials (i.e Ti versus CoCr, Al and Bone), which would cause unacceptable range and dose deviations in proton therapy, and we have demonstrated such application in FIGS. 8 and 10. The energy spectra at all locations were processed, as demonstrated at location x=0 in FIGS. 7 and 9, to form the MPE curves in FIGS. 8 and 10. Calculation of CSP from the derived MPE curves (FIGS. 8 and 10) to include the scattered protons can potentially improve the robustness of RSP measurements to set up uncertainties and quantum noise located at any single position of the MPE curves. We did not demonstrate the differentiation of elemental composition from nominal values for tissue materials in this work. Such differentiation is possible with the multi-energy computed tomography framework developed in our group (Chang C W et al, 2020a, A standardized commissioning framework of Monte Carlo dose calculation algorithms for proton pencil beam scanning treatment planning systems, Med. Phys., 47:1545-57) and can be validated with similar steps with implant materials in the future.

Among the results presented in section 2, several observations are noted and discussed in this section. To begin with, the most challenging task in the post-processing recorded clusters is to classify events by type and filter out non-proton events. In well-defined radiation sources (particle, energy, direction), the detection and the selection of primary beam particles is straightforward even by visual inspection. Discrimination becomes limited between high-energy protons and light charged particles (electrons) and between low-energy protons (approaching the Bragg peak) and energetic light He ions. Even with narrow filters detected signals from these particles can overlap and become essentially undistinguishable. In our experimental setup with a brass collimator and phantom material in the beam's path, the beam is far off from well-defined. As a result, measured energy spectra in FIGS. 7 and 9 show residual discrepancies from simulated spectra, i.e. some details present in simulations close to the primary, secondary peaks and energy tails far from peaks are not present in the measurements or vice versa. For applications beyond RSP and unavoidable high energy proton cases, more elaborate analysis with advanced techniques, such as direct analysis of LET spectra instead of LET to proton energy conversion, might be required (Jakubek J, Granja C, Hartmann B, Jaekel O, Martisikova M, Opalka L and Pospisil S, 2011, Selective detection of secondary particles and neutrons produced in ion beam therapy with 3D sensitive voxel detector, J. Instrum., 6: C12010-12010; Caicedo I D, Bergmann B, Kralik M, Kraus V, Leroy C, Pospisil S, Suk Mand Vykydal Z, 2014, IEEE Nuclear Science Symp. and Medical Imaging Conf. (NSS/MIC) (8-15 Nov. 2014 pp 1-5).

MPE proved to be robust in the determination of CSP dealing with the residual discrepancies of converted proton energy spectra in this work. Physical lengths were used in this work to approximate MLP for the calculation of RSP as we focused on demonstrating MPE work for correcting mass densities or composition or dimension of implant material from nominal values, which are required for proton MC Dose Calculation and unaffected by such approximation. Relative RSP is robust to such difference between physical length and MLP, because the same length was used for both simulation and measurement to convert ΔMPE to ΔRSP. For better accuracy of absolute RSP and in more complex clinical scenarios, MLP formalism (Schulte R W, Penfold S N, Tafas J T and Schubert K E, 2008, A maximum likelihood proton path formalism for application in proton computed tomography, Med. Phys., 35:4849-56; Brooke M D and Penfold SN, 2020, An inhomogeneous most likely path formalism for proton computed tomography, Phys. Med., 70:184-95) should be considered in those scenarios.

Second, there are some disagreements, within 3%, of RSP between in-air, in-phantom and multi-path CMAP measurements. The bone rod has the highest disagreement, the uncertainty of low mass and small diameter are about 1% each, therefore the uncertainty of mass densities can be up to 2% to inadequate energy perturbation. Such inaccuracies can be mitigated with multi-path CMAP measurements (FIG. 14), which most likely have higher accuracies than 5 mm rod measurements. The RSP uncertainties of all metal rods are within 2% with vendor provided mass densities therefore enough for metal material differentiation. The RSP accuracies of human tissue mimicking materials and metal implants can be further improved with multi-projection measurements, which are needed for non-cylindrical metal implants and discussed in future work.

Third, CSP and RSP information are extracted from energy spectra. A potential issue with this approach is how to allocate binning when deriving energy spectra from LET spectra, because LET is relatively constant for higher energy protons and drastically increases for lower energy protons. This will introduce uncertainty when the size of the sampled material is small and/or if the material is low-density and its presence does not change energy spectrum drastically. To determine the CSP, we adjusted the incoming proton energy to be lower at 70 MeV in FIG. 7 avoid the LET insensitivity for high energy protons of 210 MeV used in FIG. 9. Furthermore, finer energy bins, as low as 0.1 MeV, were used in FIG. 7 than that of FIG. 9, typically at 1 MeV, to control the uncertainty of CSP below 2%. To accurately identify MPE out of converted proton energy spectra, number of protons at the peak energy bin should be sufficiently acquired in FIGS. 7 and 9. In our study, they were on the order of thousands. MPE resolution of 0.1 MeV, i.e. geometric dimension of 0.1 mm, is an important improvement from CT images which can be potentially confused about implant diameter of 4.5 and 5.5 mm due to limit spatial resolution and metal artifacts.

Regardless of the drawbacks, use of the TPX3 detector and the proposed method shed light on and quantitatively explain poor patient outcomes in the presence of metallic implants as mentioned in the introduction. In current clinical practice, when metal implants are seen on planning CT images, they are typically delineated and bulk-assigned material properties. These results show that this approach should be practiced with extreme caution. From the CT images, it is not possible to distinguish between Ti and CoCr, and if an implant made out of CoCr is overridden with Ti, table shown in FIG. 11 suggests that there may be range uncertainties in the range of 12 mm water equivalent, even for a 5 mm diameter rod. On the other hand, even if the override was correctly performed but the delineation is off by 1 mm, FIG. 10 suggests that there may be range uncertainties in the range of 5 mm water equivalent. In comparison with the complementary MECT and MAR technique, proton counting detector can certainly remove the uncertainty due to misidentification between Ti and CoCr and improves the accuracy of metal rod delineation (McCollough C H, Leng S, Yu L and Fletcher J G, 2015, Dual- and multi-energy CT: principles, technical approaches, and clinical applications, Radiology, 276:637-53; McCollough C H, Boedeker K, Cody D, Duan X, Flohr T, Halliburton S, Hsieh J, Layman R and Pelc N J 2020 Principles and applications of multienergy CT: report of AAPM task group 291, Med. Phys., 47: e881-e912; Chang C W, Charyyev S, Harms J, Zhang T, Leng S, Zhou J, Yang X and Lin L, 2020b, Using a novel MECT simulation framework to derive tissue and implant material maps for proton Monte Carlo dose calculation, Med. Phys. submitted).

Fourth and last, the TPX3 has small sensor area and that can be error-prone to movements and misalignments. Even if there is no movement or misalignment, it is time-consuming (a 3 h window was needed to setup and sample 10-20 points) to sample large volumes, like CMAP. Alignments and shifts of detector performed manually using simple ruler and graph paper can lead to repetitious measurements to achieve accurate results, as it was in our case. To translate the proposed method into the clinic, future works should focus on increasing the efficiency of the proposed method either by acquiring larger sensor detector or automating the motion of the small sensor on a precision motion stage. Furthermore, use of pinhole to reduce flux rate is not required when the commercial proton delivery system can reduce dose rate (Stasica P, Baran J, Granja C, Krah N, Korcyl G, Oancea C, Pawlik-Niedźwiecka M, Niedźwiecki S, Rydygier M, Schiavi A, Rucinski A and Gajewski J, 2020, A simple approach for experimental characterization and validation of proton pencil beam profiles, Front. Phys., 8). Since each acquisition typically last a few seconds, multiple acquisitions can be done within a couple of minutes with motorized detectors and synchronized motion of pinhole if needed.

The work of section 2.2 to obtain 3D material/RSP map can extend the concept by sampling more of the phantom in different projections. It is expected that this kind of exercise will be highly inefficient, as with the current TPX3's sensitive area there will be a need to patch projected CSP maps. As phantom images have simpler geometry than human images, it is possible to obtain a reconstructed material map of a single slice of CMAP from sparse data by deliberately under sampling the CMAP to increase the efficiency, using compressed sensing algorithms such as PICCS (prior image constrained compressed sensing) (Chen G H, Tang J and Hsieh J, 2009 Temporal resolution improvement using PICCS in MDCT cardiac imaging, Med. Phys., 36:2130-5; Chen G-H, Tang J and Leng S, 2008, Prior image constrained compressed sensing (PICCS): a method to accurately reconstruct dynamic CT images from highly undersampled projection data sets, Med. Phys., 35:660-3; Tang J, Hsieh J and Chen G-H, 2010, Temporal resolution improvement in cardiac CT using PICCS (TRI-PICCS): performance studies, Med. Phys., 37:4377-88), a reconstruction algorithm suitable for highly under sampled data sets. After validating the framework in complicated phantoms, we can apply the validated framework to patients in clinical trials.

3. Conclusions

In summary, this work has developed a method to characterize the RSP of artificial implant and human tissue mimicking materials using most probable proton energy extracted from the LET spectrum obtained by a proton counting detector. Measured diameters of a dense metal rod like Ti or CoCr were found to agree with TOPAS simulated results. Additionally, accurate RSPs for phantom material can be derived by minimizing RMSE of multiple CSPs. As a result, the novel proton counting detector may serve as a primary method to provide material maps, required by proton Monte Carlo Dose calculation, or as a secondary check to competing MAR and MECT techniques.

Figure 16:
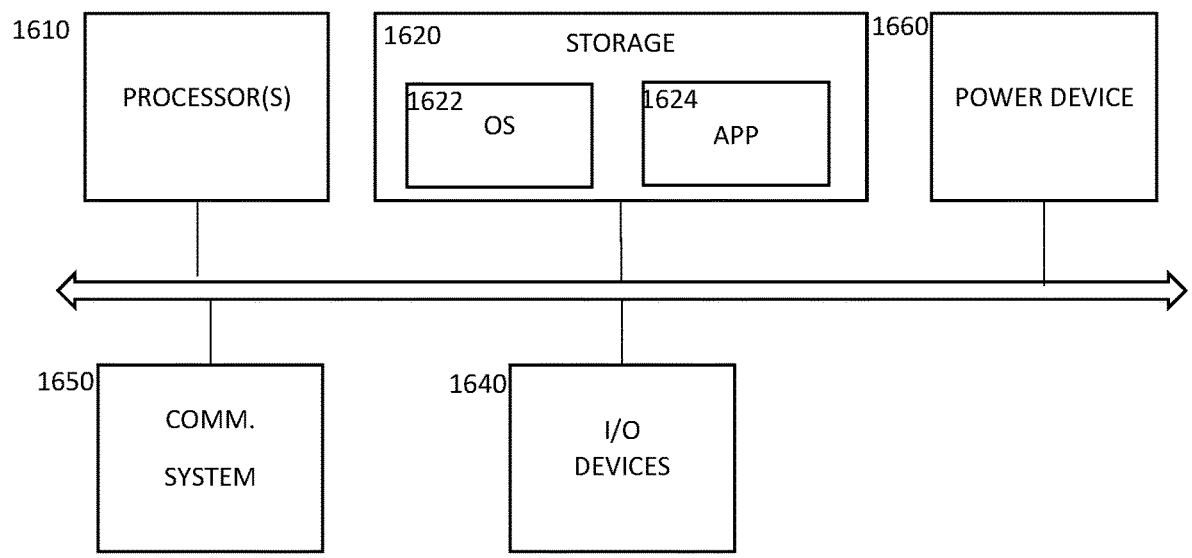
FIG. 16 is a simplified block diagram of an example of a computing system for implementing certain embodiments disclosed herein.

FIG. 16 depicts a block diagram of an example computing system 1600 for implementing certain embodiments. For example, in some aspects, the computer system 1600 may include computing systems associated with a device (e.g., the device 110) performing one or more processes (e.g., FIG. 2) disclosed herein. The block diagram illustrates some electronic components or subsystems of the computing system. The computing system 1600 depicted in FIG. 16 is merely an example and is not intended to unduly limit the scope of inventive embodiments recited in the claims. One of ordinary skill in the art would recognize many possible variations, alternatives, and modifications. For example, in some implementations, the computing system 1600 may have more or fewer subsystems than those shown in FIG. 16, may combine two or more subsystems, or may have a different configuration or arrangement of subsystems.

In the example shown in FIG. 16, the computing system 1600 may include one or more processing units 1610 and storage 1620. The processing units 1610 may be configured to execute instructions for performing various operations, and can include, for example, a micro-controller, a general-purpose processor, or a microprocessor suitable for implementation within a portable electronic device, such as a Raspberry Pi. The processing units 1610 may be communicatively coupled with a plurality of components within the computing system 1600. For example, the processing units 1610 may communicate with other components across a bus. The bus may be any subsystem adapted to transfer data within the computing system 1600. The bus may include a plurality of computer buses and additional circuitry to transfer data.

In some embodiments, the processing units 1610 may be coupled to the storage 1620. In some embodiments, the storage 1620 may offer both short-term and long-term storage and may be divided into several units. The storage 1620 may be volatile, such as static random access memory (SRAM) and/or dynamic random access memory (DRAM), and/or non-volatile, such as read-only memory (ROM), flash memory, and the like. Furthermore, the storage 1620 may include removable storage devices, such as secure digital (SD) cards. The storage 1620 may provide storage of computer readable instructions, data structures, program modules, audio recordings, image files, video recordings, and other data for the computing system 1600. In some embodiments, the storage 1620 may be distributed into different hardware modules. A set of instructions and/or code might be stored on the storage 1620. The instructions might take the form of executable code that may be executable by the computing system 1600, and/or might take the form of source and/or installable code, which, upon compilation and/or installation on the computing system 1600 (e.g., using any of a variety of generally available compilers, installation programs, compression/decompression utilities, and the like), may take the form of executable code.

In some embodiments, the storage 1620 may store a plurality of application modules 1624, which may include any number of applications, such as applications for controlling input/output (I/O) devices 1640 (e.g., a sensor (e.g., sensor(s) 16160, other sensor(s), etc.)), a switch, a camera, a microphone or audio recorder, a speaker, a media player, a display device, etc.). The application modules 1624 may include particular instructions to be executed by the processing units 1610. In some embodiments, certain applications or parts of the application modules 1624 may be executable by other hardware modules, such as a communication subsystem 1650. In certain embodiments, the storage 1620 may additionally include secure memory, which may include additional security controls to prevent copying or other unauthorized access to secure information.

In some embodiments, the storage 1620 may include an operating system 1622 loaded therein, such as an Android operating system or any other operating system suitable for mobile devices or portable devices. The operating system 1622 may be operable to initiate the execution of the instructions provided by the application modules 1624 and/or manage other hardware modules as well as interfaces with a communication subsystem 1650 which may include one or more wireless or wired transceivers. The operating system 1622 may be adapted to perform other operations across the components of the computing system 1600 including threading, resource management, data storage control, and other similar functionality.

The communication subsystem 1650 may include, for example, an infrared communication device, a wireless communication device and/or chipset (such as a Bluetooth® device, an IEEE 802.11 (Wi-Fi) device, a WiMax device, cellular communication facilities, and the like), NFC, ZigBee, and/or similar communication interfaces. The computing system 1600 may include one or more antennas (not shown in FIG. 16) for wireless communication as part of the communication subsystem 1650 or as a separate component coupled to any portion of the system.

Depending on desired functionality, the communication subsystem 1650 may include separate transceivers to communicate with base transceiver stations and other wireless devices and access points, which may include communicating with different data networks and/or network types, such as wireless wide-area networks (WWANs), WLANs, or wireless personal area networks (WPANs). A WWAN may be, for example, a WiMax (IEEE 802.9) network. A WLAN may be, for example, an IEEE 802.11x network. A WPAN may be, for example, a Bluetooth network, an IEEE 802.16x, or some other types of network. The techniques described herein may also be used for any combination of WWAN, WLAN, and/or WPAN. In some embodiments, the communications subsystem 1650 may include wired communication devices, such as Universal Serial Bus (USB) devices, Universal Asynchronous Receiver/Transmitter (UART) devices, Ethernet devices, and the like. The communications subsystem 1650 may permit data to be exchanged with a network, other computing systems, and/or any other devices described herein. The communication subsystem 1650 may include a means for transmitting or receiving data, such as identifiers of portable goal tracking devices, position data, a geographic map, a heat map, photos, or videos, using antennas and wireless links. The communication subsystem 1650, the processing units 1610, and the storage 1620 may together comprise at least a part of one or more of a means for performing some functions disclosed herein.

The computing system 1600 may include one or more I/O devices 1640, such as sensors 16160, a switch, a camera, a microphone or audio recorder, a communication port, or the like. For example, the I/O devices 1640 may include one or more touch sensors or button sensors associated with the buttons. The touch sensors or button sensors may include, for example, a mechanical switch or a capacitive sensor that can sense the touching or pressing of a button.

In some embodiments, the I/O devices 1640 may include a microphone or audio recorder that may be used to record an audio message. The microphone and audio recorder may include, for example, a condenser or capacitive microphone using silicon diaphragms, a piezoelectric acoustic sensor, or an electret microphone. In some embodiments, the microphone and audio recorder may be a voice-activated device. In some embodiments, the microphone and audio recorder may record an audio clip in a digital format, such as MP3, WAV, WMA, DSS, etc. The recorded audio files may be saved to the storage 1620 or may be sent to the one or more network servers through the communication subsystem 1650.

In some embodiments, the I/O devices 1640 may include a location tracking device, such as a global positioning system (GPS) receiver. In some embodiments, the I/O devices 1640 may include a wired communication port, such as a micro-USB, Lightning, or Thunderbolt transceiver.

The I/O devices 1640 may also include, for example, a speaker, a media player, a display device, a communication port, or the like. For example, the I/O devices 1640 may include a display device, such as an LED or LCD display and the corresponding driver circuit. The I/O devices 1640 may include a text, audio, or video player that may display a text message, play an audio clip, or display a video clip.

The computing system 1600 may include a power device 1660, such as a rechargeable battery for providing electrical power to other circuits on the computing system 1600. The rechargeable battery may include, for example, one or more alkaline batteries, lead-acid batteries, lithium-ion batteries, zinc-carbon batteries, and NiCd or NiMH batteries. The computing system 1600 may also include a battery charger for charging the rechargeable battery. In some embodiments, the battery charger may include a wireless charging antenna that may support, for example, one of Qi, Power Matters Association (PMA), or Association for Wireless Power (A4WP) standard, and may operate at different frequencies. In some embodiments, the battery charger may include a hard-wired connector, such as, for example, a micro-USB or Lightning® connector, for charging the rechargeable battery using a hard-wired connection. The power device 1660 may also include some power management integrated circuits, power regulators, power convertors, and the like.

In some embodiments, the computing system 1600 may include one or more sensors 16160. The sensors 16160 may include, for example, the sensors as described above.

The computing system 1600 may be implemented in many different ways. In some embodiments, the different components of the computing system 1600 described above may be integrated to a same printed circuit board. In some embodiments, the different components of the computing system 1600 described above may be placed in different physical locations and interconnected by, for example, electrical wires. The computing system 1600 may be implemented in various physical forms and may have various external appearances. The components of computing system 1600 may be positioned based on the specific physical form.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a subscription and data receiving associated with a different subscription, such identifiers are merely for convenience and are not meant to limit various embodiments to a particular order, sequence, type of network or carrier.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing systems, (e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more example embodiments, the functions described may be implemented in hardware, software, firmware, or any combination thereof. If implemented in software, the functions may be stored as one or more instructions or code on a non-transitory computer readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, and the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The disclosures of each and every publication cited herein are hereby incorporated herein by reference in their entirety.

While the disclosure has been described in detail with reference to exemplary embodiments, those skilled in the art will appreciate that various modifications and substitutions may be made thereto without departing from the spirit and scope of the disclosure as set forth in the appended claims. For example, elements and/or features of different exemplary embodiments may be combined with each other and/or substituted for each other within the scope of this disclosure and appended claims.

What is claimed is:

1. A method for generating a material map for a volume of interest, comprising:
   receiving particle counting data and representation data for a volume of interest of a patient for one or more sessions;
   determining most probable energy (MPE) using particle energy determined from the particle counting data;
   generating a plurality of simulations that simulate interactions using different combination of properties for the volume of interest determined from the representation data and/or from a database to determine the MPE for each simulation, the one or more properties including geometry, material composition, and mass density;
   comparing the MPE determined using the particle counting data to the MPE determined from each simulation;
   selecting one simulation of the plurality of simulations based on the comparing; and
   generating a material map for the volume of interest using the one or more properties corresponding to the one simulation;
   wherein:
   the particle counting data includes one or more parameters associated with each particle path acquired in each session; and
   the determining the MPE using particle energy for each session determined from the particle data includes:
     determining linear energy transfer (LET) spectrum for each session using the one or more parameters for the particle counting data; and
     determining particle events for each session using the energy value associated with the LET spectrum; and
     converting the LET spectrum for each particle event to energy spectrum for each session; and the most probable energy is determined using the energy spectrum.

2. The method according to claim 1, wherein the volume of interest includes a metal implant.

3. The method according to claim 2, wherein the comparing includes determining root-mean-square error (RSME) between the MPE determined using the particle counting data and the MPE for each simulation.

4. The method according to claim 3, wherein the particle counting data is proton data acquired by a proton counting detector.

5. The method according to claim 2, wherein the representation data is acquired by a medical imaging system, the medical imaging system including a proton computer tomography (CT) system and/or a photon CT system.

6. The method according to claim 5, wherein the generating the plurality of simulations to determine the MPE for each simulation includes:
  determining an initial combination of the one or more properties of the volume of interest using the representation data;
  determining one or more additional combinations of the one or more properties, each additional combination having one or more of the one or more properties that are different from the initial combination and other additional combinations;
  generating a simulation for the initial combination and for each additional combination to determine LET spectrum for particle events;
  converting the LET spectrum for each simulation to a particle event-specific energy spectrum for each simulation; and
  determining the MPE for each simulation using the energy spectrum.

7. The method according to claim 2, further comprising;
generating a treatment plan using the material map.

8. The method according to claim 7, further comprising:
controlling a particle therapy system according to the treatment plan to perform particle therapy on the patient.

9. The method according to claim 1, wherein the simulations are Monte-Carlo (MC) simulations.

10. A system, comprising:
  one or more processors; and
  one or more hardware storage devices having stored thereon computer-executable instructions which are executable by the one or more processors to cause the computing system to perform at least the following:
    receiving particle counting data and representation data for a volume of interest of a patient for one or more sessions;
    determining most probable energy (MPE) using particle energy determined from the particle counting data;
    generating a plurality of simulations that simulate interactions using different combination of properties for the volume of interest determined from the representation data and/or from a database to determine the MPE for each simulation, the one or more properties including geometry, material composition, and mass density;
    comparing the MPE determined using the particle counting data to the MPE determined from each simulation;
    selecting one simulation of the plurality of simulations based on the comparing; and
    generating a material map for the volume of interest using the one or more properties corresponding to the one simulation;
  wherein:
    the particle counting data includes one or more parameters associated with each particle path acquired in each session; and
    the determining the MPE using particle energy for each session determined from the particle data includes:
      determining linear energy transfer (LET) spectrum for each session using the one or more parameters for the particle counting data; and
      determining particle events for each session using the energy value associated with the LET spectrum; and
      converting the LET spectrum for each particle event to energy spectrum for each session; and
    the most probable energy is determined using the energy spectrum.

11. The system according to claim 10, wherein the volume of interest includes a metal implant.

12. The system according to claim 11, wherein the comparing includes determining root mean square error (RSME) between the MPE determined using the particle counting data and the MPE for each simulation.

13. The system according to claim 12, wherein the particle counting data is proton data acquired by a proton counting detector.

14. The system according to claim 13, wherein the simulations are Monte-Carlo (MC) simulations.

15. The system according to claim 11, wherein the representation data is acquired by a medical imaging system, the medical imaging system including a proton computer tomography (CT) system and/or a photon CT system.

16. The system according to claim 15, wherein the generating the plurality of simulations to determine the MPE for each simulation includes:
  determining an initial combination of the one or more properties of the volume of interest using the representation data;
  determining one or more additional combinations of the one or more properties, each additional combination having one or more of the one or more properties that are different from the initial combination and other additional combinations;
  generating a simulation for the initial combination and for each additional combination to determine LET spectrum for particle events;
  converting the LET spectrum for each simulation to a particle event-specific energy spectrum for each simulation; and
  determining the MPE for each simulation using the energy spectrum.

17. The system according to claim 11, wherein the one or more processors are further configured to cause the computing system to perform at least the following:
  generating a treatment plan using the material map.

18. The system according to claim 17, wherein the one or more processors are further configured to cause the computing system to perform at least the following:
  controlling a particle therapy system according to the treatment plan to perform particle therapy on the patient.

19. A method for generating a material map for a volume of interest, comprising:
  receiving particle counting data and representation data for a volume of interest of a patient for one or more sessions;

determining most probable energy (MPE) using particle energy determined from the particle counting data;

generating a plurality of simulations that simulate interactions using different combination of properties for the volume of interest determined from the representation data and/or from a database to determine the MPE for each simulation, the one or more properties including geometry, material composition, and mass density;

comparing the MPE determined using the particle counting data to the MPE determined from each simulation;

selecting one simulation of the plurality of simulations based on the comparing; and generating a material map for the volume of interest using the one or more properties corresponding to the one simulation;

wherein the generating the plurality of simulations to determine the MPE for each simulation includes:
  determining an initial combination of the one or more properties of the volume of interest using the representation data;
  determining one or more additional combinations of the one or more properties, each additional combination having one or more of the one or more properties that are different from the initial combination and other additional combinations;
  generating a simulation for the initial combination and for each additional combination to determine LET spectrum for particle events;
  converting the LET spectrum for each simulation to a particle event-specific energy spectrum for each simulation; and
  determining the MPE for each simulation using the energy spectrum.

20. The method according to claim 19, wherein:
the volume of interest includes a metal implant; and
the representation data is acquired by a medical imaging system, the medical imaging system including a proton computer tomography (CT) system and/or a photon CT system.

* * * * *